(12) United States Patent
Kurohara

(10) Patent No.: US 8,708,571 B2
(45) Date of Patent: Apr. 29, 2014

(54) ROLLING BEARING UNIT WITH COMBINED SEAL RING AND MANUFACTURING METHOD THEREOF

(75) Inventor: Hirofumi Kurohara, Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 13/522,058

(22) PCT Filed: Jan. 11, 2011

(86) PCT No.: PCT/JP2011/050236
§ 371 (c)(1),
(2), (4) Date: Oct. 1, 2012

(87) PCT Pub. No.: WO2011/086982
PCT Pub. Date: Jul. 21, 2011

(65) Prior Publication Data
US 2013/0022305 A1 Jan. 24, 2013

(30) Foreign Application Priority Data

Jan. 13, 2010 (JP) .................................. 2010-004615
Oct. 14, 2010 (JP) .................................. 2010-231427

(51) Int. Cl.
*F16C 33/58* (2006.01)
(52) U.S. Cl.
USPC ..................................................... 384/569
(58) Field of Classification Search
USPC ......... 384/477, 478, 480–482, 484–486, 513, 384/515, 569, 571; 29/898.066
See application file for complete search history.

(56) References Cited

U.S. PATENT DOCUMENTS

2002/0001422 A1* 1/2002 Maldera et al. ............... 384/486
2008/0310782 A1* 12/2008 Walter ........................... 384/486

FOREIGN PATENT DOCUMENTS

| JP | 2001-193745 A | 7/2001 |
| JP | 2001-289254 A | 10/2001 |
| JP | 2005-140181 A | 6/2005 |
| JP | 2006-329320 A | 12/2006 |
| JP | 2006-329322 A | 12/2006 |
| JP | 2007-187217 A | 7/2007 |
| JP | 2008-128450 A | 6/2008 |
| JP | 2008-256064 A | 10/2008 |

* cited by examiner

*Primary Examiner* — Phillip A Johnson
(74) *Attorney, Agent, or Firm* — Miles & Stockbridge P.C.

(57) ABSTRACT

Construction of a rolling bearing unit with a combined seal ring that enables press fitting of a cylindrical section 15 of a slinger 13 to be pressure fitted on to a slinger fitting surface 20 of an inner ring 19a without losing the seal between the slinger fitting surface 20 and the cylindrical section 15 is achieved. Of the surface of the inner ring 19a, the continuous section that comprises a portion corresponding to the slinger fitting surface portion 20, a portion corresponding to the chamfered section 25a and a joining section 27a between these portions are simultaneously ground with a formed grindstone. As a result, the continuous section is entirely formed into a flat surface with no non-differential corners in the cross section, or in other words, with no sharp corners.

2 Claims, 17 Drawing Sheets

ROLLING BEARING UNIT WITH COMBINED SEAL RING AND MANUFACTURING METHOD THEREOF

TECHNICAL FIELD

The present invention relates to a rolling bearing unit for supporting a wheel of an automobile, for example, such that the wheel rotates freely with respect to a suspension, and more particularly relates to the improvement of a rolling bearing unit with combined seal ring, and the manufacturing method thereof; wherein the opening on the end section of an annular space, which is located between the opposing circumferential surfaces of a rotational-side ring and a stationary-side ring where a plurality of rolling elements are located, is sealed by a combined seal ring that comprises a slinger and a seal ring.

BACKGROUND ART

FIG. 15 and FIG. 16 illustrate an example of conventional construction of a rolling bearing unit for supporting a wheel of an automobile such that the wheel rotates freely with respect to the suspension. In the rolling bearing unit 1 that is illustrated in FIG. 15 and FIG. 16, an outer ring 2, which is a stationary-side ring that does not rotate during operation and that is supported by and fastened to the suspension, and a hub 3, which is a rotational-side ring that rotates during operation and is fastened to and supports the wheel, are arranged so as to be concentric with each other. A plurality of balls 6, which are rolling elements are arranged between each of two rows of outer raceways 4, which are each stationary-side raceways, that are formed around the inner circumferential surface of the outer ring 2, and two rows of inner raceways 5, which are each rotational-side raceways, that are formed around the outer circumferential surface of the hub 3. The balls 6 are held by a retainer 7 so as to be able to roll freely. The hub 3 comprises a hub body 18 and an inner ring 19 that is fastened around the inside end in the axial direction of the hub body 18. In this specification, the "outside" in the axial direction means the outside in the width direction of the vehicle when the bearing is assembled in the vehicle, or in other words, indicates the left side in each of the drawings. On the other hand, the "inside" in the axial direction means the center side in the width direction of the vehicle, or in other words, indicates the right side in each of the drawings. Of the inner raceways 5, the inner raceway 5 that is on the outside in the axial direction is formed around the outer circumferential surface in the middle section in the axial direction of the hub body 18, and the inner raceway 5 that is on the inside in the axial direction is formed around the outer circumferential surface of the inner ring 19. In the case of a bearing that is used in a heavy vehicle, rollers may be used instead of balls as the rolling elements.

The openings on both end sections of the annular space 8 between the inner circumferential surface of the outer ring 2 and the outer circumferential surface of the hub 3, where the balls 6 are located, are respectively sealed all the way around by a seal ring 9 and a combined seal ring 10. As a result, it is possible to prevent grease leakage from the annular space 8 to the external space, and it is possible to prevent foreign matter such as moisture, dust and the like that exists in the external space from entering inside the annular space 8. The seal ring 9 comprises a circular ring-shaped seal member 11 made of an elastic material and a circular ring-shaped metal insert 12 that reinforces the seal member 11. With this metal insert 12 fastened around the outside end section in the axial direction of the outer ring 2 by a tight fit, the tip end edges of a plurality of seal lips of the seal member 11 are brought in sliding contact all the way around the outer circumferential surface of the middle section in the axial direction of the hub body 18.

Moreover, the combined seal ring 10 comprises a slinger 13 and a seal ring 14. The slinger 13 is formed into a circular ring-shape around the entire circumference with an L-shaped cross section by punching or bending metal plate using a stamping process such as a burring process, and comprises: a cylindrical section 15 that extends in the axial direction; a circular ring section 16 that is bent outward in the radial direction from the edge on the inside end in the axial direction of the cylindrical section 15, and a curved section 17 having an arc shaped cross section that exists in the connecting section between the cylindrical section 15 and the circular ring section 16. This kind of slinger 13 is fastened to the inner ring 19 by fitting the cylindrical section 15 onto the cylindrical shaped slinger fitting surface 20 that is formed around the outer circumferential surface of the inside end in the axial direction of the inner ring 19 by a tight fit (press fit). Moreover, the seal ring 14 comprises a circular ring-shaped seal member 21 that is made of an elastic material, and a circular ring-shaped metal insert 22 that reinforces the seal member 21. This kind of seal ring 14 is fastened to the outer ring 2 by fitting the cylindrical section 23 that is formed on the outer peripheral edge section of the metal insert 22 into the cylindrical shaped seal ring fitting surface 24 that is formed around the inner circumferential surface on the inside end section in the axial direction of the outer ring 2 by a tight fit (press+fit). In this state, the tip end edges of a plurality of seal lips of the seal member 21 are brought into sliding contact all the way around the circumference of the surface of the slinger 13. Chamfered sections 25, 26 having an arc shaped cross section are formed on the edge section on the inside end in the axial direction of the outer circumferential surface of the inner ring 19 and the edge section on the inside end in the axial direction of the inner circumferential surface of the outer ring 2. These chamfered sections 25, 26 function as guides when the press fitting of the cylindrical sections 15, 23 onto the slinger fitting surface 20 and into the seal ring fitting surface 24 from the inside in the axial direction is carried out.

When manufacturing this kind of rolling bearing unit 1, the outer ring 2 and hub 3 (hub body 18, inner ring 19) are made by going through a plurality of processes such as a turning process for obtaining a specified shape and dimensions, heat treatment for increasing hardness and toughness, and grinding for preparing the surface precision and surface roughness of the outer raceways 4, inner raceways 5, seal ring fitting surface 24 and slinger fitting surface 20. Of these, as a method for efficiently performing grinding, JP2006-329322(A) discloses a method as illustrated in FIG. 17 of grinding both the inner raceway 5 on the inside in the axial direction and the slinger fitting surface 20 at the same time by a formed grindstone 31, and a method as illustrated in FIG. 18 of grinding both the outer raceway 4 on the inside in the axial direction and the seal ring fitting surface 24 at the same time using a formed grindstone 35.

Incidentally, when performing grinding by the methods illustrated in FIG. 17 and FIG. 18 and described above, there is a possibility that the following problems may occur. That is, when manufacturing the inner ring 19, the slinger fitting surface 20 and the chamfered section 25 that are adjacent to each other are formed by turning before heat treatment such that in the state before heat treatment the edges of the respective ends are smoothly continuous with each other. The same is also true for the seal ring fitting surface 24 and the chamfered section 26 when manufacturing the outer ring 2.

However, after undergoing heat treatment, in the state after grinding has been performed, the continuous section between the edges of the end sections is no longer smooth. In other words, in the inner ring 19, of the slinger fitting surface 20 and the chamfered section 25, only the slinger fitting surface 20 is ground, and in the outer ring 2, of the seal ring fitting surface 24 and the chamfered section 26, only the seal ring fitting surface 24 is ground, so an edge section comprising a sharp corner section (a non-differential corner section in the cross-sectional shape) is formed in the joining section 27 between the ground slinger fitting surface 20 and the turned chamfered section 25, and in the joining section 32 between the ground seal ring fitting surface 24 and the turned chamfered section 26.

Particularly, because the difference in the thickness at each site of the inner ring 19 and the outer ring 2 is large, it becomes easy for the difference in the amount of thermal expansion during heat treatment at each site to become large, and a loss of roundness after heat treatment also becomes large, so it becomes necessary to take away large cutting stock during the grinding processes above. As a result, the tip ends of the edge sections in the joining section 27 and joining section 32 become sharp, and are formed unevenly around the circumference. Therefore, when press fitting the cylindrical section 15 of the slinger 13 over the slinger fitting surface 20, and the cylindrical section 23 of the seal ring 14 over the seal ring fitting surface 24 from the inside in the axial direction, the joining section 27 and joining section 32 do not function properly as guides for putting the cylindrical section 15 and cylindrical section 23 onto the slinger fitting surface 20 and the seal ring fitting surface 24, so there is a possibility that the slinger 13 and seal ring 14 will be tilted, or that the inner circumferential surface of the cylindrical section 15 and the outer circumferential surface of the cylindrical section 23 will be damaged in the axial direction by the edge sections.

Particularly, in the case of the slinger 13, the rigidity of the cylindrical section 15 becomes higher closer to the circular ring section 16. Therefore, when the tight fit of the cylindrical section 15 on the slinger fitting surface 20 is uniformly set all around, the surface pressure between slinger fitting surface 20 and the cylindrical section 15 becomes higher closer to the circular ring section 16. This means that the width and depth of damage in the axial direction to the inner circumferential surface of the cylindrical section 15 during press fitting becomes greater in the portion nearer to the circular ring section 16, and is the greatest in the portion the closest to the circular ring section 16, or in other words, at the inside end section in the axial direction of the inner circumferential surface of the cylindrical section 15. Moreover, as damage is formed, chips that are removed from the inner circumferential surface of the cylindrical section 15 act as built-up edges that become larger as press fitting proceeds, and the cross-sectional area of the damage also becomes large. As a result, the damage penetrates through the inside end section in the axial direction of the inner circumferential surface of this cylindrical section 15, and it becomes easy for damage, whose cross-sectional area becomes larger going toward the inside in the axial direction, to be formed along the entire length in the axial direction.

In the case of the seal ring 14 as well, as the press fitting described above proceeds, there is a possibility that damage will occur along the entire length in the axial direction of the outer circumferential surface of the cylindrical section 23 of the metal insert 22, or in other words, in the portion that fits with and comes in contact with the seal ring fitting surface 24. However, in the case of the conventional construction described above, the outer edge section of the seal member 21 that is fastened to the metal insert 22 comes in elastic contact all around the inner circumferential surface on the inside end section in the axial direction of the outer ring 2. Therefore, even though damage occurs along the entire length in the axial direction of the outer circumferential surface of the cylindrical section 23, the outer edge section around the seal member 21 is able to maintain the seal between the cylindrical section 23 and the seal ring fitting surface 24 to a certain extent.

On the other hand, in the case of the slinger 13, unlike the case of the seal ring 14, there is no seal member. Therefore, as the press fitting described above proceeds and damage is formed along the entire length in the axial direction on the inner circumferential surface of the cylindrical section 15 of the slinger 13, this damage causes the seal at the area of fit between the cylindrical section 15 and the slinger fitting surface 20 to be lost. In other words, due to this damage, it becomes easier for grease inside the annular space 8 to leak out into the external space, and for foreign matter such as moisture, dust and the like that exists in the external space to enter into the annular space 8.

RELATED LITERATURE

Patent Literature

[Patent Literature 1] Japanese Patent Application No. 2006-329322

SUMMARY OF THE INVENTION

Problem to be Solved by the Invention

In consideration of the situation described above, the object of the present invention is to provide a rolling bearing unit with seal ring, and the manufacturing thereof wherein the rolling bearing unit is assembled such that there is no loss in the seal in the fitting section between at least one race and the slinger.

Means for Solving the Problems

The rolling bearing unit with a combined seal ring of the present invention comprises a rolling bearing unit and a combined seal ring.

The rolling bearing unit comprises: a rotational-side ring and a stationary-side ring that are arranged concentric with each other; and a plurality of rolling elements that are located between a rotational-side track and a stationary-side track that are formed on opposing circumferential surfaces of the rotational-side ring and the stationary-side ring so as to be able to roll freely.

The combined seal ring comprises a slinger and a seal ring that seal the openings of an annular space that exists between the opposing circumferential surfaces of the rotational-side ring and the stationary-side ring.

The slinger is made of metal plate that is entirely formed into a circular ring shape that includes a cylindrical section in part of the radial direction that extends in the axial direction. More specifically, the slinger is formed entirely into a circular ring shape by stamping process such as pressing or bending, and comprises a cylindrical section that extends in the axial direction, and a circular ring section that extends in the radial direction from the inside end section in the axial direction of the cylindrical section. The cylindrical section is fitted onto a cylindrical shaped slinger fitting surface, which is formed on a portion in the axial direction of the circumferential surface of one of the rotational-side ring or stationary-side ring that faces the circumferential surface of the other ring, with a tight fit by performing press fitting from one side in the axial direction of the slinger fitting surface.

The seal ring comprises a circular ring shaped metal insert and a circular ring shaped seal member made of an elastic material and reinforced by the metal insert. The metal insert fits on a portion in the axial direction of the circumferential surface of the other ring that faces the slinger, and the tip end sections of a plurality of seal lips of the seal member comes into sliding contact around the entire surface of the slinger.

Particularly, in the rolling bearing unit with a combined seal ring of the present invention; by simultaneously grinding with a formed grindstone a continuous section of the surface of the one ring that comprise a portion corresponding to the slinger fitting surface, a portion corresponding to another surface that is adjacent to one side in the axial direction of the slinger fitting surface, and a joining section between the portion corresponding to the slinger fitting surface and the portion corresponding to the other surface after performing heat treatment of the one ring, the continuous section is entirely formed into a smooth, continuous flat surface with no sharp corners, or in other words no non-differential corners in the cross-sectional shape.

Moreover, in the manufacturing method for the rolling bearing unit with a combined seal ring of the present invention, by simultaneously grinding with a formed grindstone the continuous section of the surface of the one ring that comprise a portion corresponding to the slinger fitting surface, a portion corresponding to another surface that is adjacent to one side in the axial direction of the slinger fitting surface, and a joining section between the portion corresponding to the slinger fitting surface and the portion corresponding to the other surface after performing heat treatment of the one ring, the continuous section is entirely formed into a smooth, continuous flat surface with no sharp corner, or in other words, with no non-differential corners in the cross-sectional shape.

The present invention can also be applied to a rolling bearing unit with a combined seal ring, wherein the metal insert of the seal ring is made of metal plate and is entirely formed into a circular ring shape that includes a cylindrical section in part of the radial direction that extends in the axial direction, such that the cylindrical section is fitted onto a cylindrical shaped seal ring fitting surface, which is formed on a portion in the axial direction of the circumferential surface of the other ring that faces the slinger, with a tight fit by performing press fitting from on side in the axial direction of the seal ring fitting surface.

In this case, by simultaneously grinding with a formed grindstone the continuous section of the surface of the other ring that comprise a portion corresponding to the seal ring fitting surface, a portion corresponding to another surface that is adjacent to one side in the axial direction of the seal ring fitting surface, and a joining section between the portion corresponding to the seal ring fitting surface and the portion corresponding to the other surface after heat treatment of the other ring, the connecting portions entirely become a smooth, continuous flat surface with no sharp corners, or in other words, with non-differential corners in the cross-sectional shape.

Similarly, in the manufacturing method, in addition to making part of one ring a smooth, continuous flat surface after heat treatment of the one ring, by simultaneously grinding with a formed grindstone a continuous section of the surface of the other ring that comprise a portion corresponding to the seal ring fitting surface, a portion corresponding to another surface that is adjacent to one side in the axial direction of the seal ring fitting surface, and a joining section between the portion corresponding to the seal ring fitting surface and the portion corresponding to the other surface after heat treatment of the other ring, the continuous section entirely become a smooth, continuous flat surface with no sharp corners, or in other words, with no non-differential corners in the cross-sectional shape.

Moreover, when embodying the rolling bearing unit with a combined seal ring of the present invention, when a slinger that comprises: a cylindrical section; a circular ring section that is bent in the radial direction toward the other ring from the edge of one end in the axial direction, which is the edge of the end in the axial direction of the cylindrical section on the opposite side (side on one end in the axial direction) from the press fitting direction of the cylindrical section onto the slinger fitting surface; and a curved section having an arc shaped cross section that is located in the connecting section between the circular ring section and the cylindrical section is used as the slinger, preferably, only the other end section and middle section in the axial direction of the cylindrical section that exist in the tip end side (other end side in the axial direction) and the middle section of the press fitting direction of the cylindrical section onto the slinger fitting surface, is fitted onto the slinger fitting surface by a tight fit by performing press fitting from one side in the axial direction of the slinger fitting surface.

Each form of the invention can be used independently or can be combined together.

Effect of the Invention

In the rolling bearing unit with combined seal ring of the present invention, of the surface of the one ring, the joining section between the portion corresponding to the slinger fitting surface and the portion corresponding to another surface that is adjacent to one side in the axial direction of the slinger fitting surface has no non-differential corners, or in other words no sharp corners in the cross section, such that the portion of this joining section is a smooth, flat surface. The case of this joining section having corners with rounded tip ends is also included in the concept of this continuous, flat smooth surface. Furthermore, the portion of this joining section is a portion in which there is hardly any waviness in the circumferential direction. In other words, when press fitting the cylindrical section of the slinger onto the slinger fitting surface, the portion of the joining section normally functions as a guide for putting this cylindrical section onto the slinger fitting surface, so together with being able to prevent inclination of the slinger, is shaped such that it is difficult for damage to occur in the axial direction on the circumferential surface of this cylindrical section. Therefore, it becomes difficult for the problem of losing a seal in the fit between one ring and the slinger due to damage in the axial direction on the circumferential surface of this cylindrical section during press fitting.

Moreover, in the rolling bearing unit with combined seal ring of the present invention, of the surface of the other ring, the joining section between the portion corresponding to the seal ring fitting surface and the portion corresponding to another surface that is adjacent in the axial direction of the seal ring fitting surface is a smooth, flat surface with no non-differential corners in the cross-section, and is a portion with hardly any waviness in the circumferential direction. Therefore, when press fitting the cylindrical section of the metal insert of the seal ring onto the seal ring fitting surface, this joining section as well normally functions as a guide for putting the cylindrical section onto the seal ring fitting surface, so a similar effect can be obtained.

On the other hand, when only the other end section and the middle section in the axial direction of the cylindrical section of the slinger is pressure fitted onto the slinger fitting surface from one side in the axial direction of this slinger fitting surface, and during press fitting, even though the joining section between the portion corresponding to the slinger fitting surface and the portion corresponding to the other surface that is adjacent to one side in the axial direction of the slinger fitting surface has a non-differential corner, or in other words, a sharp corner in the cross section shape, and damage in the axial direction occurs on the circumferential surface of the cylindrical section of the slinger, that damage in the axial direction does not pass trough in the axial direction through the fitting section between the slinger fitting surface and the slinger. In other words, formation of this damage in the axial direction stops at the end second on the external space side of the fitting section and does not open up into the external space. Therefore, it is possible to avoid the problem of damage penetrating in the axial direction through the fitting section, causing a large loss in the seal of this fitting section.

In this form, it is possible to substantially increase the contact width in the axial direction between the slinger fitting surface and the surface of the cylindrical section of the slinger, and/or it is possible to obtain the effect of being able to make the contact pressure between the slinger fitting surface and the surface of the cylindrical section of the slinger uniform around the entire circumference. Therefore, it is possible to improve robustness, and it is possible to simplify the design for improving the seal in the fitting section between the slinger fitting surface and the cylindrical section.

Each form of devising the shape of the joining section can be applied independently, however, preferably these forms are applied together.

EMBODIMENT OF CARRYING OUT THE INVENTION

First Example of Embodiment

FIG. 1 to FIG. 5 illustrate a first example of an embodiment of the present invention. The features of this example are how the shape of the outer circumferential surface of the inside end section in the axial direction of the inner ring 19a, the shape of the inner circumferential surface of the inside end section in the axial direction of the outer ring 2a, and the processing methods of these are devised. The construction and function of the other parts are the same as in the conventional construction illustrated in FIG. 15 and FIG. 16 described above, so redundant drawings and explanations are omitted or simplified, such that the explanation below centers on the features of this example.

Figure 1:
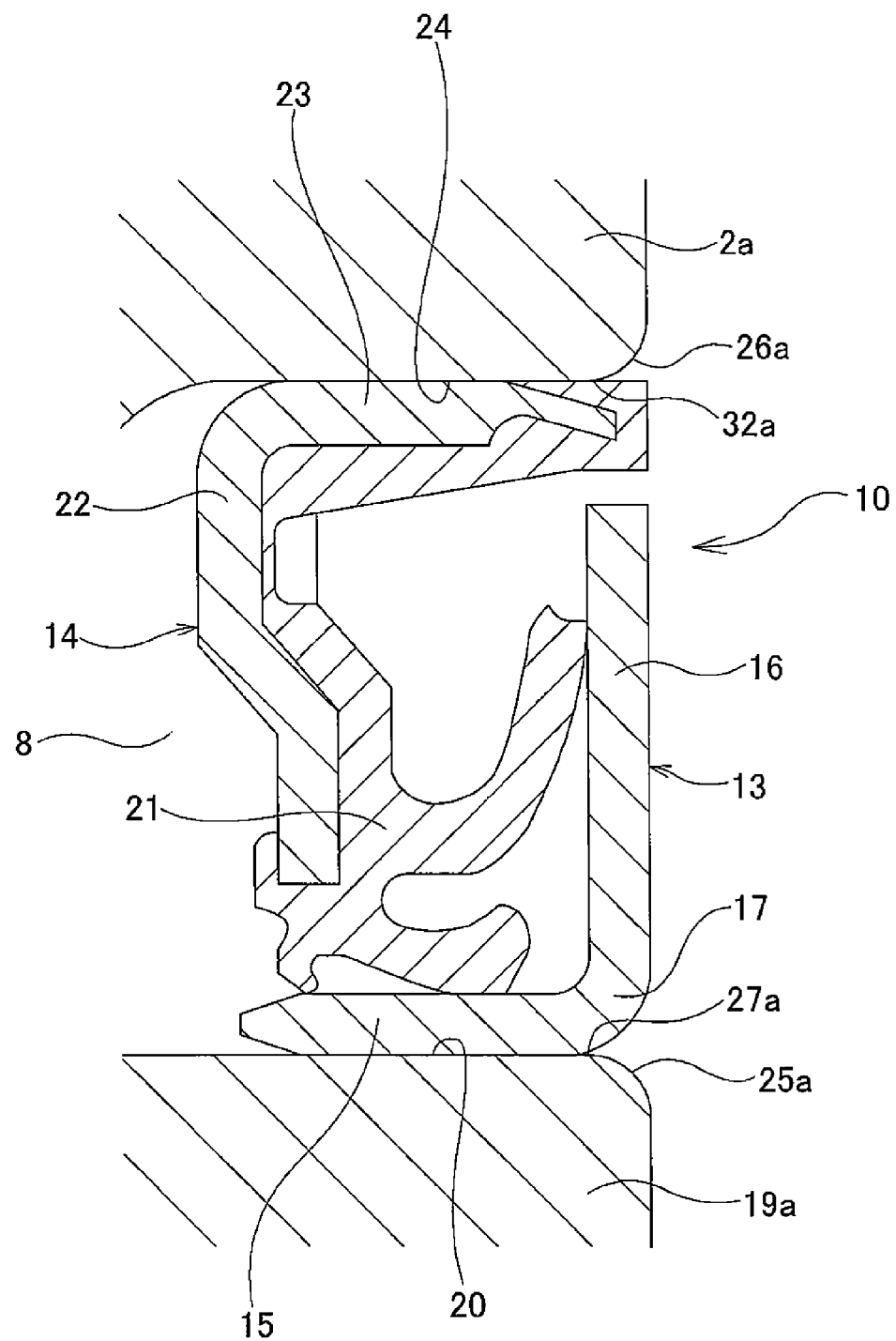
FIG. 1 illustrates a first example of an embodiment of the present invention, and is an enlarged cross-sectional view illustrating the fitted state of a combined seal ring.
Figure 2:
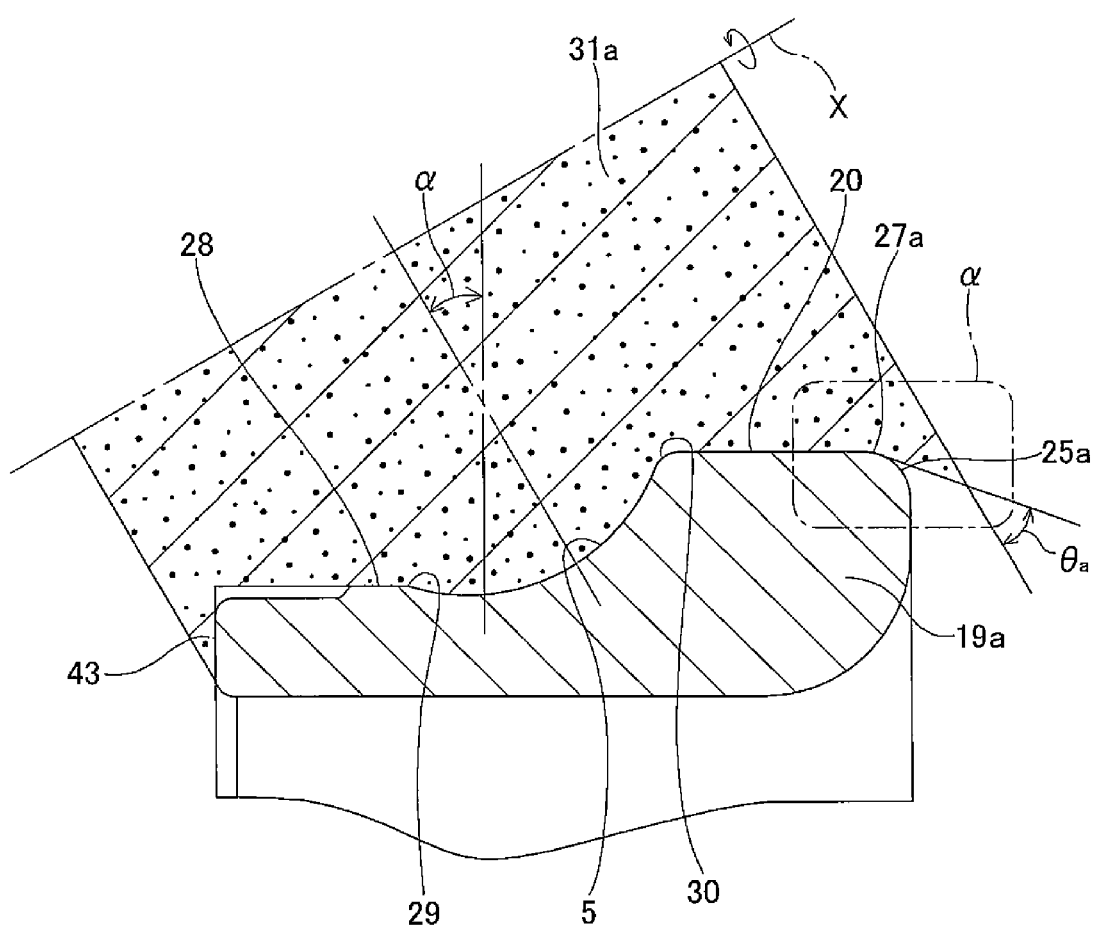
FIG. 2 is a partial cross-sectional view illustrating a grinding method for grinding the surface of the inner ring of the first example.
Figure 3:
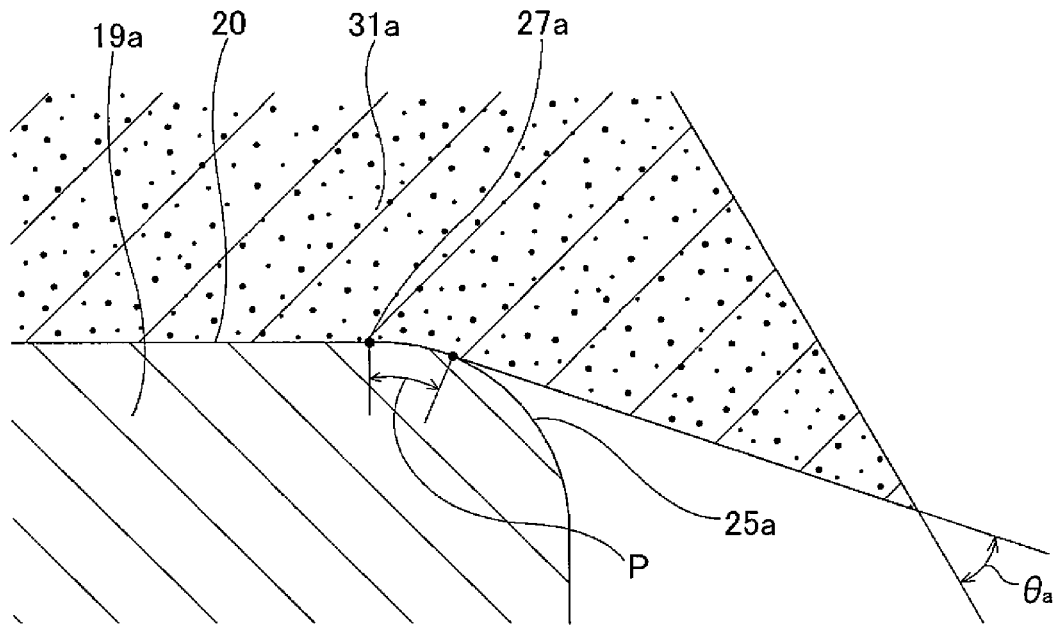
FIG. 3 is an enlarged view of part a in FIG. 2.

In this example, of the outer circumferential surface of the inner ring 19a, the entire continuous section of the portion corresponding to the cylindrical shaped slinger fitting surface 20 that is on the inside end section in the axial direction, the portion on the outer diameter side (portion on the outside in the axial direction) of the arc shaped chamfered section 25a that is on the edge of the inside end in the axial direction, and the joining section 27a between both of these portions have a cross-sectional shape that is a non-differential corner section, or in other words, are not sharp corners but are ground surfaces (flat smooth surfaces) that are continuously smooth. Therefore, in this example, in the finishing stage of the manufacturing process of the inner ring 19a, or in other words, as illustrated in FIG. 2 and FIG. 3, in the stage after the turning process for obtaining a specified shape and dimensions, and heat treatment for increasing hardness and toughness have been sequentially performed, of the surface of the inner ring 19a, grinding is performed simultaneously using a formed grindstone 31a on the portion corresponding to the outside end surface 43 in the axial direction, the portion corresponding to the counter bore 28 that is near the outside end in the axial direction, the portion corresponding to the inner raceway 5, the portion corresponding to the slinger fitting surface 20, the portion of the outer diameter side of the chamfered section 25a, the joining section 29 between the portion corresponding to the counter bore 28 and the portion corresponding to the inner raceway 5, the joining section 30 between the portion corresponding to the inner raceway 5 and the portion corresponding to the slinger fitting surface 20 and the joining section 27a between the portion corresponding to the slinger fitting surface 20 and the portion of the outer diameter side of the chamfered section 25a.

In this example, the center axis of rotation X of the grindstone 31a is arranged in an orthogonal direction to the direction of the contact angle α that is applied by the inner raceway 5 on the rolling element 6 (FIG. 15), and the feed direction of cutting by the grindstone 31a nearly matches the direction of this contact angle α (direction orthogonal to the center axis of rotation X). Moreover, in this example, in order that the inner raceway 5 has a precise contour shape, and has a ground surface having good roughness that can be eliminated during the super finishing process, which is a post process, a grindstone 31a is selected and used that is high grade and has relatively fine grain. Typically, in the case of this kind of grindstone 31a, when the inclination angle of the processing surface with respect to the cutting feed direction is less than 45 degrees, it becomes easy for clogging to occur on the processing surface, and as a result, it becomes easy for grinding burns or grinding cracks to occur on the processed surface. Therefore, in this example, only the cross-sectional shape of the portion (portion in area P in FIG. 3) facing the portion on the outer diameter side of the chamfered section 25a (portion of the chamfered section 25a where the inclination of the tangent line with respect to the cutting feed direction is 45 degrees or more) of the processing surface of the grindstone 31a is an arc shape that matches the cross-sectional shape of that portion on the outer diameter side, and the cross-sectional shape of the portion that is further on the inside in the axial direction (right side in FIG. 3) is straight with an inclination angle $\theta_a$ that is 45 degrees with respect to the cutting feed direction.

As described above, the cutting feed direction of the grindstone 31a coincides with the direction of the contact angle α. This contact angle α is always about 30 to 40 degrees with respect to the radial direction of the inner ring 19a. Therefore, the grinding range for the chamfered section 25a is the range from the edge on the outside end in the axial direction of the chamfered section 25a to about 15 to 5 degrees with respect to the radial direction of the inner ring 19a (toward the inside in the axial direction). In this example, the inclination angle of the grinding range of the chamfered section 25a with respect to the cutting feed direction is greater than the inclination angle of the slinger fitting surface 20, so it is possible for the surface roughness of the ground surface of the chamfered section 25a to be better than the surface roughness of the slinger fitting surface 20. Therefore, within this grinding range of the chamfered section 25a, it is possible to improve the function of the chamfered section 25a as a guide for putting the slinger 13 onto the slinger fitting surface 20 during press fitting.

Figure 4:
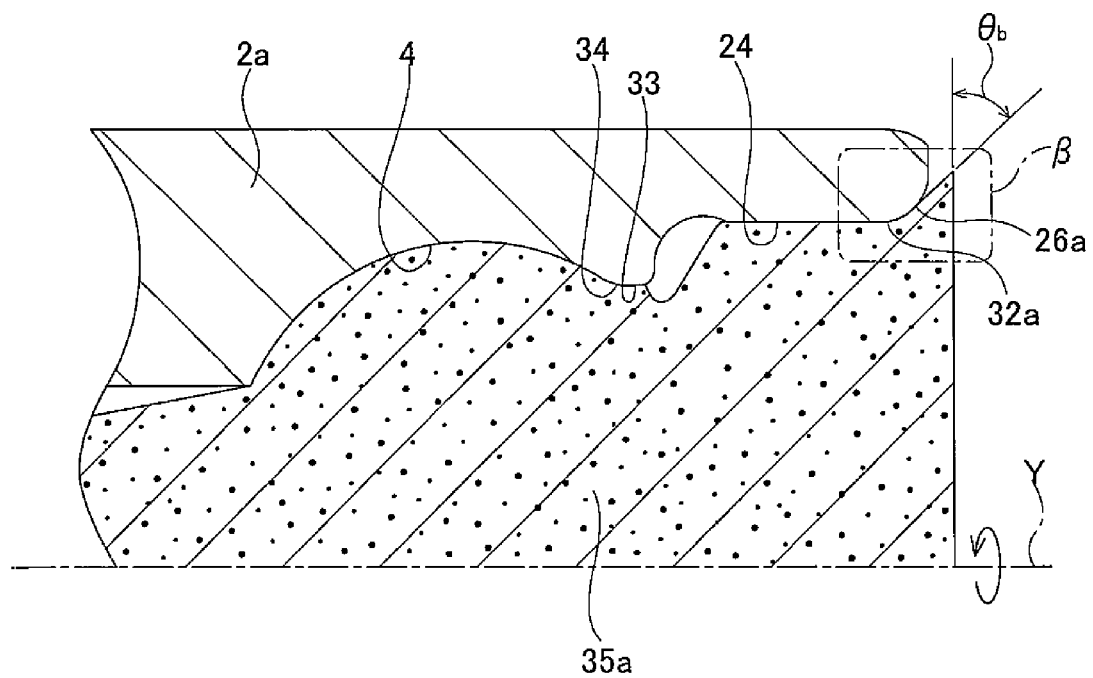
FIG. 4 is a partial cross-sectional view illustrating a grinding method for grinding the surface of the outer ring of the first example.
Figure 5:
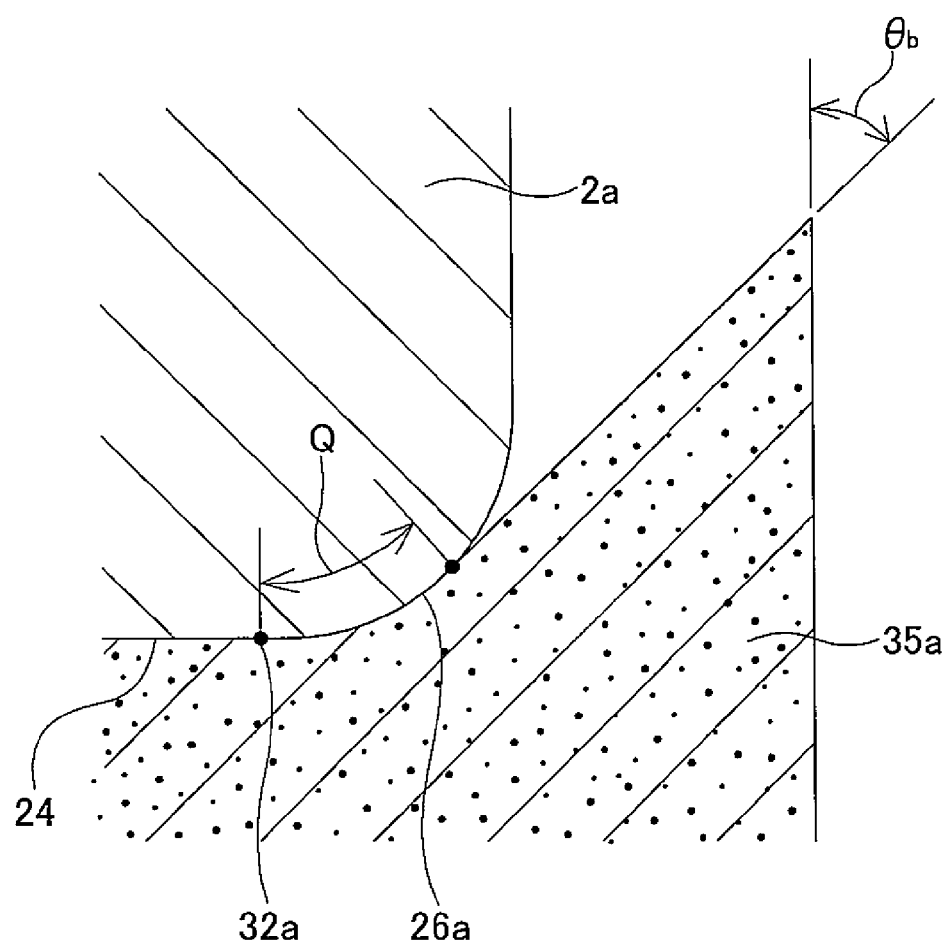
FIG. 5 is an enlarged view of part β in FIG. 4.

Moreover, in this example, of the inner circumferential surface of the outer ring 2a, the entire continuous section of the portion corresponding to the cylindrical seal ring fitting surface 24 that is on the inside end section in the axial direction, the portion on the inner diameter side of the arc shaped chamfered section 26a that is on the edge on the inside end in the axial direction (portion on the outside in the axial direction), and the joining section 32a between these portions have a cross-sectional shape that is a non-differential corner section, or in other words, are not sharp corners but are ground surfaces (flat smooth surfaces) that are continuously smooth. Therefore, in this example, in the finishing stage of the manufacturing process of the outer ring 2a, or in other words, as illustrated in FIG. 4 and FIG. 5, in the stage after the turning process for obtaining a specified shape and dimensions, and heat treatment for increasing hardness and toughness have been sequentially performed, of the surface of the outer ring 2a, grinding is performed simultaneously using a formed grindstone 35a on the continuous section comprising a portion of the outer raceway 4 on the inside in the axial direction, a portion of the counter bore 33 that is in the portion near the inside end in the axial direction, and the joining section 34 between both of these portion, and the continuous section comprising the portion corresponding to the seal ring fitting surface 24, the portion on the inner-diameter side of the chamfered section 26a, and the joining section 32a between both of these portions.

In this example, the center axis of rotation Y of the grindstone 35a is parallel with the center axis of the outer ring 2a, and the cutting feed direction of the grindstone 35a coincides with the radial direction of the outer ring 2a. Moreover, in this example, in order that the outer raceway 4 can be processed to a ground surface having an accurate contour shape and good roughness that can be eliminated during super finishing in a later process, a high-grade grindstone having a comparatively fine grain size is selected and used as the grindstone 35a.

For the same reason, of the processing surface of the grindstone 35a, only the cross-sectional shape of the portion (portion Q in FIG. 5) that faces the portion on the inner-diameter side of the chamfered section 26a (portion of the chamfered section 26a where the inclination angle of the tangent line with respect to the cutting feed direction is 45 degrees or greater) is an arc shape that matches the cross-sectional shape of that portion on the inner diameter side, and the cross-sectional shape of the portion further on the inside in the axial direction (right side in FIG. 4) is straight and has an inclination angle $\theta_b$ with respect to the cutting feed direction that is 45 degrees. As described above, the cutting feed direction of the grindstone 35a coincides with the radial direction of the outer ring 2a, so the grinding range of the chamfered section 26a is a range from the edge on the outside end in the axial direction of the chamfered section 26a to 45 degrees with respect to the radial direction of the outer ring 2a (going toward the inside in the axial direction). Similarly, the inclination angle of the grinding range of the chamfered section 26a with respect to the cutting feed direction is greater than the inclination angle of the seal ring fitting surface 24, so the surface roughness of the grinding range of this chamfered section 26a can be made to be better than the surface roughness of the seal ring fitting surface 24. Therefore, in the grinding range of this chamfered section 26a, it is possible to improve the function of the chamfered section 26a as a guide for putting the seal ring 14 onto the seal ring fitting surface 24 during press fitting.

In the case of the rolling bearing unit with a combined seal ring of this example constructed as described above and the manufacturing method thereof, of the surface of the inner ring 19a, the cross-sectional shape of the joining section 27a between the portion corresponding to the slinger fitting surface 20 and the portion on the outer diameter side of the chamfered section 25a is not a non-differential sharp corner, and there is hardly any waviness in the circumferential direction. In other words, when press fitting the cylindrical section 15 of the slinger 13 onto the slinger fitting surface 20, it is difficult for the joining section 27a to cause damage in the axial direction to the inner circumferential surface of the cylindrical section 15. Therefore, when performing this press fitting, it is possible to make it difficult for the problem of losing the seal between the inner ring 19a and the slinger 13 due to damage in the axial direction on the inner circumferential surface of the cylindrical section 15 from occurring.

Furthermore, the surface roughness of the portion on the outer diameter side of the chamfered section 25a is better than the surface roughness of the slinger fitting surface 20, so during the press fitting described above, it is possible to avoid the problem of the slinger 13 getting caught on the portion on the outer diameter side of the chamfered section 25a, and the orientation of the slinger 13 becoming tilted.

Moreover, in this example, of the surface of the outer ring 2a, the cross-sectional shape of the joining section 32a between the portion corresponding to the seal ring fitting surface 24 and the portion on the inner diameter side of the chamfered section 26a is not a non-differential, sharp corner, and there is hardly any waviness in the circumferential direction. In other words, when press fitting the cylindrical section 23 of the metal insert 22 of the seal ring 14 over the seal ring fitting surface 24, it is difficult for the joining section 32a to cause damage in the axial direction to the outer circumferential surface of the cylindrical section 23. Therefore, when performing this press fitting, it is possible to make it difficult for the problem of losing the seal between the outer ring 2a and the seal ring 14 due to damage in the axial direction on the outer circumferential surface of the cylindrical section 23 from occurring. Furthermore, the surface roughness of the portion on the inner diameter side of the chamfered section 26a is better than the surface roughness of the seal ring fitting surface 24, so during the press fitting described above, it is possible to avoid the problem of the seal ring 14 getting caught on the portion on the inner diameter side of the chamfered section 26a, and the orientation of the seal ring 14 becoming tilted.

In the case of the first example described above, the grinding range of the chamfered section 25a of the inner ring 19a tends to be less than the grinding range of the chamfered section 26a of the outer ring 2a, however, the diameter of the edge on the inside end in the axial direction of the grinding range of the chamfered section 25a of the inner ring 19a must be at least less than the inner diameter dimension of the cylindrical section 15 of the slinger 13 before press fitting. When it appears not to be possible to maintain the grinding range of the chamfered section 25a of the inner ring 19a enough to meet such a requirement, the requirement described above is met by making the inclination angle $\theta_a$ less than 45 degrees, and more specifically, less than an amount such that clogging of the processing surface does not easily occur, or by changing the shape and dimensions of the chamfered section 25a of the inner ring 19a. Alternatively, the inclination angle of the center axis of rotation of the grindstone 31a with respect to the center axis of the inner ring 19a can be less than in the first example above.

Second Example of Embodiment

Figure 6:
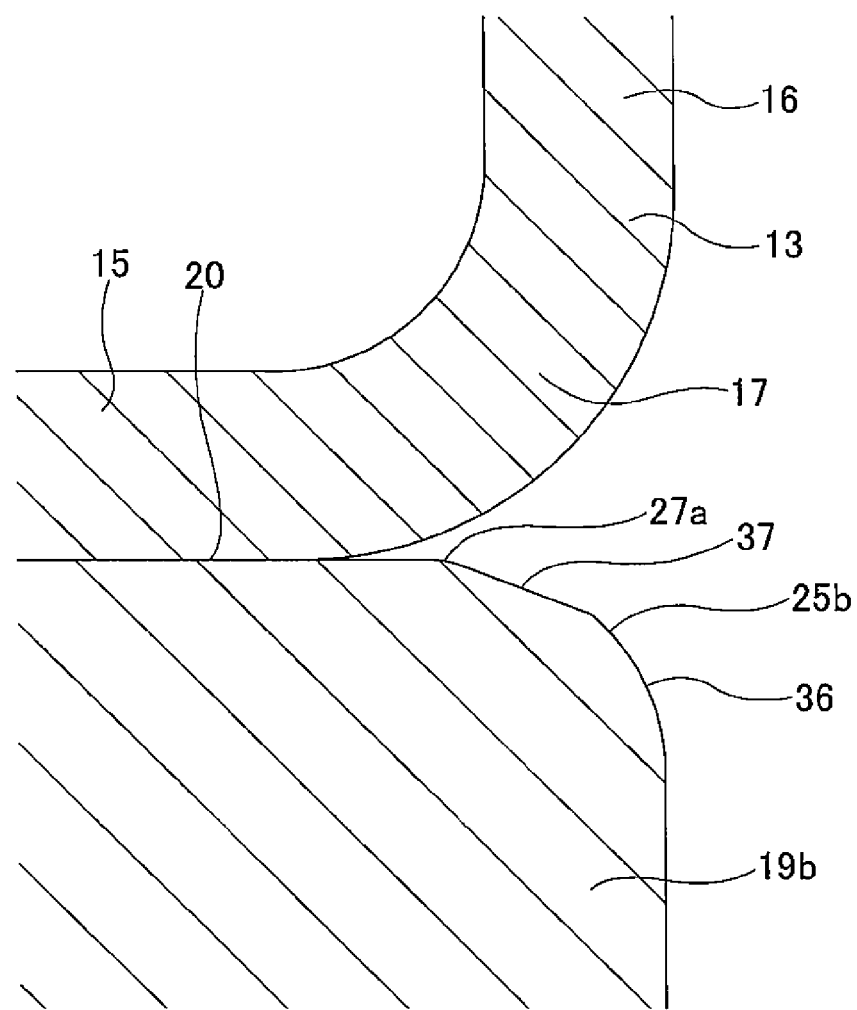
FIG. 6 illustrates a second example of an embodiment of the present invention, and is an enlarged cross-sectional view of the inside end section in the axial direction of the fitting section between the inner ring and the slinger.

FIG. 6 illustrates a second example of an embodiment of the present invention. In this example, the chamfered section 25b that is formed on the inside end section in the axial direction of the outer circumferential surface of the inner ring 19b comprises a complex curved surface that is a combination of an arc shaped convex surface section 36 that is formed by turning before heat treatment of the inner ring 19b, and a conical surface section 37 on the outer diameter side that is formed by grinding after the heat treatment. In other words, in this example, after a chamfered section having a simple arc shaped cross section is formed by turning before the heat treatment, the chamfered section 25b is formed by finishing the portion on the outer diameter side of this chamfered section into a conical surface section 37 by grinding after the heat treatment. In this example as well, of the outer circumferential surface of the inner ring 19b, by simultaneously grinding the continuous section that comprises the portion corresponding to the slinger fitting surface 20, the portion on the outer diameter side of the chamfered section 25b (portion that is finished into the conical surface section 37) and the joining section 27a between these portions with a formed grindstone, the continuous section is entirely made into a flat, smooth with no non-differential corner in the cross-sectional shape.

In this example, having the construction described above, the portion (ground surface) on the outer diameter side of the chamfered section 25b is a conical surface section 37, so it becomes easy to make the diameter of the edge on the inside end in the axial direction of this portion on the outer diameter side smaller than the inner diameter dimension of the cylindrical section 15 of the slinger 13 before press fitting. The other construction and functions are the same as in the first example described above.

Third Example of Embodiment

Figure 7:
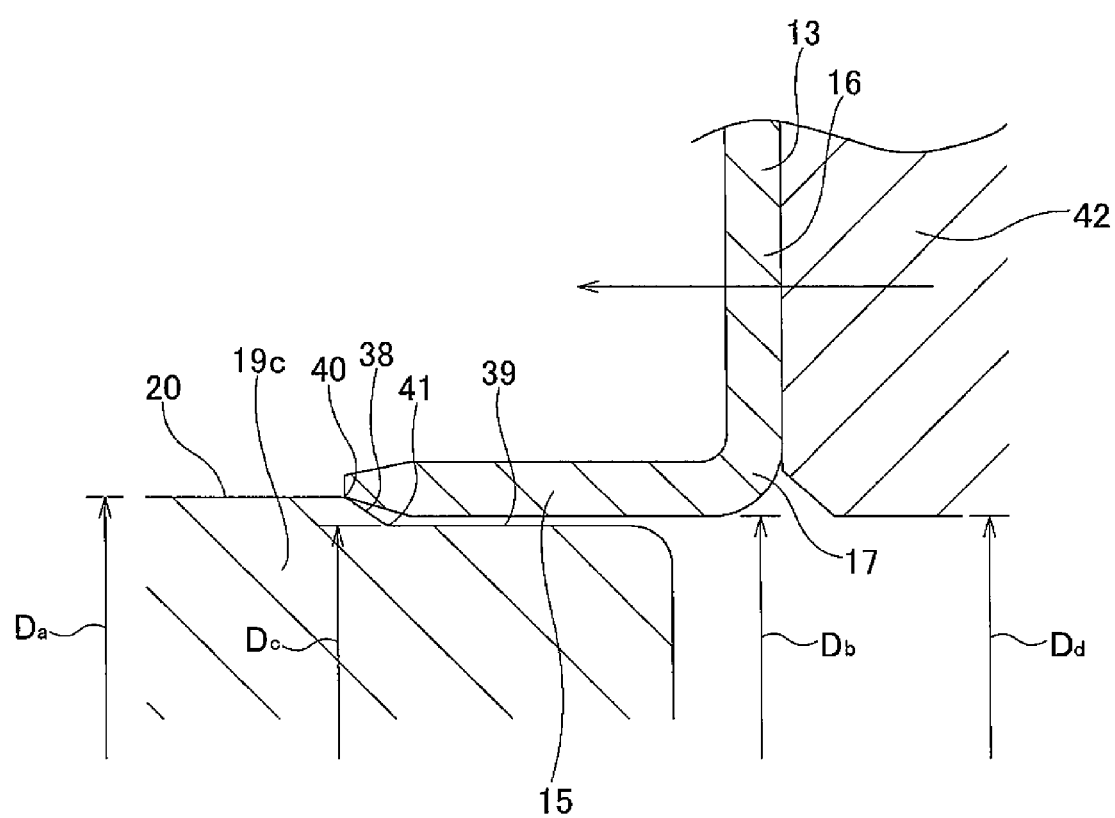
FIG. 7 illustrates a third example of an embodiment of the present invention, and is an enlarged cross-sectional view illustrating the state immediately before press fitting the slinger over the outer circumferential surface of the inner ring.

FIG. 7 illustrates a third example of an embodiment of the present invention. In this example, of the outer circumferential surface of the inner ring 19c, a conical surface section 38 whose outer diameter dimension becomes smaller going toward the inside in the axial direction is formed adjacent to the inside in the axial direction of the slinger fitting surface 20, and a cylindrical shaped small-diameter stepped section 39 is formed adjacent to the inside in the axial direction of the conical surface section 38. By using a formed grindstone to simultaneously grind the continuous section that comprises the portion corresponding to the slinger fitting surface 20, the portion corresponding to the conical surface section 38, the portion corresponding to the small-diameter stepped section 39, the joining section 40 between the portions corresponding to the slinger fitting surface 20 and the conical surface section 38, and the joining section 41 between the portions corresponding to the conical surface section 38 and the small-diameter stepped section 39, the continuous section is entirely made into a flat, smooth surface with no non-differential corners in the cross-sectional shape. The outer diameter dimension $D_a$ of the slinger fitting surface 20, is larger than the inner diameter dimension $D_b$ of the cylindrical section 15 of the slinger 13 before press fitting by the amount of the tight fit ($D_a > D_b$), however, the outer diameter dimension $D_e$ of the small stepped section 39 is a little less than the inner diameter dimension $D_b$ of the cylindrical section 15 of the slinger 13 before press fitting ($D_e < D_b$).

In the case of this example, having the construction described above, when press fitting the cylindrical section 15 of the slinger 13 over the slinger fitting surface 20, the small-diameter stepped section 39 functions as a centering guide for the cylindrical section 15, and the conical surface section 38 functions as a guide for putting the cylindrical section 15 onto the slinger fitting surface 20. Particularly, in this example, there is a small-diameter section 39, which works as a centering guide for the cylindrical section 15, so it is possible to prevent the occurrence of problems such as tilting of the center axis of the cylindrical section 15 in the initial stage of the press fitting, and damage in the axial direction starting where scoring occurs on the inner circumferential surface of the cylindrical section 15.

Moreover, the slinger fitting surface 20 and the conical surface section 38 are smoothly connected by the joining section 40. Therefore, during press fitting, it is possible to prevent damage in the axial direction on the inner circumferential surface of the cylindrical section 15 by this joining section 40. Together with this, it is possible to suppress the force in the outward radial direction to which the cylindrical section 15 is subjected when the cylindrical section 15 passes the conical surface section 38 and the portion of the joining section 40. Therefore, as the cylindrical section 15 passes, it is possible to sufficiently suppress plastic transformation, such as the diameter of the cylindrical section 15 becoming larger going toward the outside in the axial direction, from occurring, and thus a tight fit between the inner circumferential surface of the cylindrical section 15 and the slinger fitting surface 20 is possible. The other construction and functions are the same as in the first example illustrated in FIG. 1 to FIG. 5 described above.

In the case of a rolling bearing unit having construction wherein the inside end section in the axial direction of the inner ring 19c (portion where the small-diameter stepped section 39 is formed) of the third example protrudes further inward in the axial direction than the inside end surface in the axial direction of the outer ring, the relationship of the outer diameter dimension $D_e$ of the small-diameter stepped section 39 and the inner diameter dimension $D_a$ of the press fitting tool 42 for the slinger 13 is such that $D_a > D_e$, so the small-diameter stepped section 39 can also function as a centering guide for the press fitting tool 42.

Fourth Example of Embodiment

Figure 8:
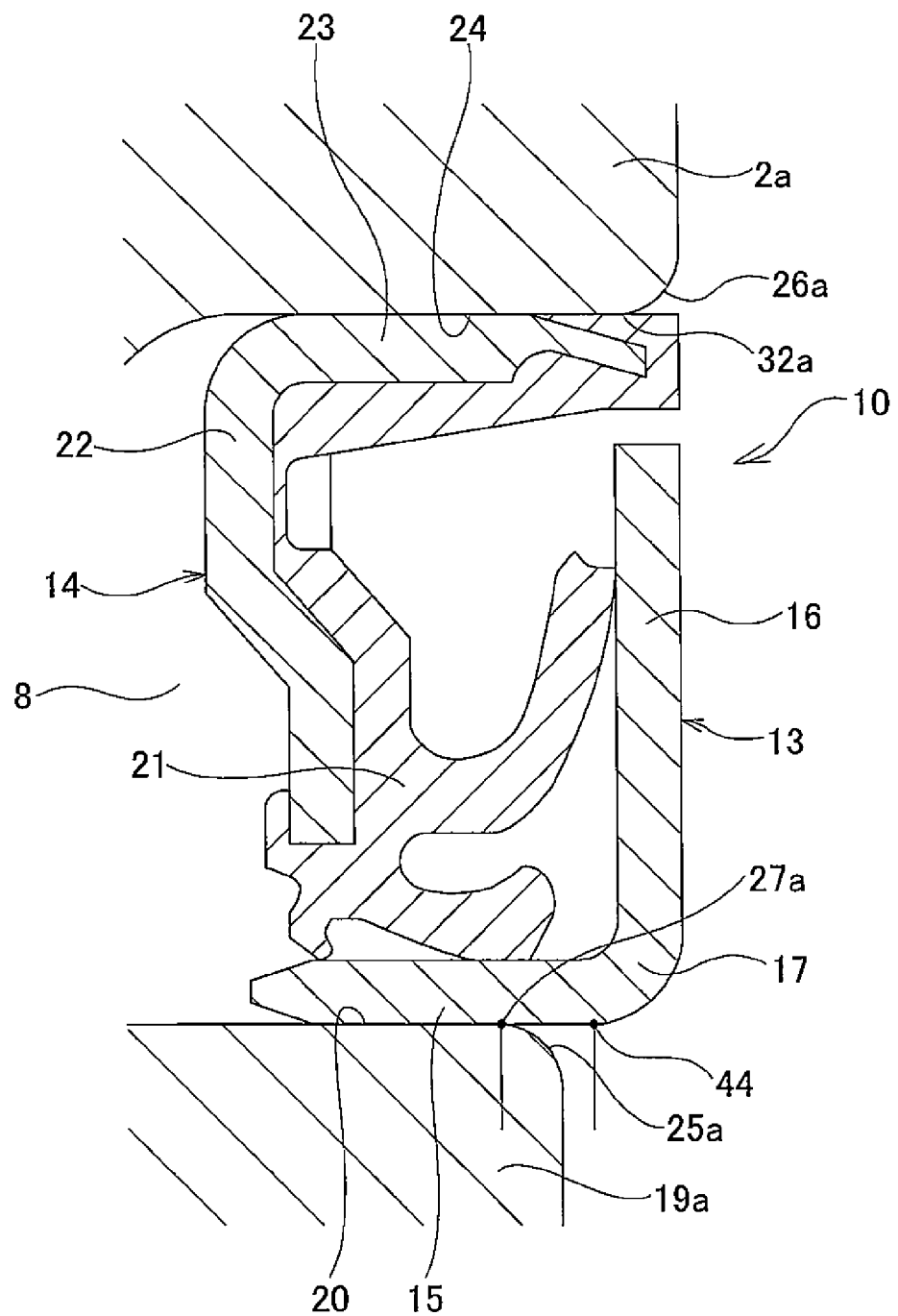
FIG. 8 illustrates a fourth example of an embodiment of the present invention, and is a cross-sectional view similar to FIG. 1.

FIG. 8 illustrates a fourth example of an embodiment of the present invention. In this example, only the outside end section and middle section in the axial direction of the cylindrical section 15 of the slinger 13 is fitted around the slinger fitting surface 20 of the inner ring 19a with a tight fit by performing press fitting from the inside in the axial direction. In other words, in this example, with the slinger 13 fitted over the slinger fitting surface 20 in this way, the slinger R end section 44, which is the joining section between the inner circumferential surface of the cylindrical section 15 of the slinger and the inner circumferential surface of a curved section 17, is located further on the inside in the axial direction (right side in FIG. 8) than the joining section 27a between the slinger fitting surface 20 and the chamfered section 25a. In this example, having the construction described above, only the outside end section and middle section in the axial direction of the cylindrical section 15 of the slinger is pressure fitted over the slinger fitting surface 20 from the inside in the axial direction, so, when performing the press fitting, even though the portion of the joining section 27a between the slinger fitting surface 20 and the chamfered section 25a damages the inner circumferential surface of the cylindrical section 15 in the axial direction, the damage is not formed so as to penetrate in the axial direction through the slinger fitting surface 20 and cylindrical section 15. In other words, generation of this damage in the axial direction stops at the end section (right end section in FIG. 8) of the external space side of the fitting section, and does not open to the external space. Therefore, it is possible to avoid the problem of losing the seal in the fitting section due to damage penetrating in the axial direction through this fitting section.

In this example, it is possible to increase the area of substantial contact in the axial direction between the slinger fitting surface 20 and the cylindrical section 15 of the slinger 13. In other words, when press fitting the entire cylindrical section 15 of the slinger onto the slinger fitting surface 20, due to the effect of the stress in the circumferential direction of the circular ring section 16 on one edge in the axial direction of the slinger 13, it becomes easy for a state to occur in which only the portion of the edge on the one end in the axial direction of the circumferential surface of the cylindrical section 15 to come in strong contact with the slinger fitting surface 20, and in which the other portions in the axial direction of this circumferential surface hardly come in contact. In a state such as this, the area of substantial contact in the axial direction between the slinger fitting surface 20 and the circumferential surface of the cylindrical section 15 become very small, or in other words, the width of substantial contact in the axial direction becomes the width in the axial direction of the portion of the edge on one end in the axial direction of this cylindrical section 15.

On the other hand, in this example, by press fitting only the other end section and middle section in the axial direction of the cylindrical section 15 of the slinger 13 (portion that is separated from the circular ring section 16 and that has nearly the same rigidity) onto the slinger fitting surface 20, and not press fitting the inside end section, which is one end section in the axial direction of the cylindrical section 15 (portion that is located near the circular ring section 16, and that has higher rigidity than the other portions), there is hardly any effect from the stress in the circumferential direction of the circular ring section 16 that is on the edge of one end in the axial direction of the slinger 13, and it is possible for the enter circumferential surface of the other end section and middle section in the axial direction of the cylindrical section 15 to come in strong contact with the slinger fitting surface 20. As a result, it is possible to increase the width of substantial contact in the axial direction between the slinger fitting surface 20 and the circumferential surface of the cylindrical section 15, or in other words, it is possible to make the width of substantial contact in the axial direction equal to the width in the axial direction of the other end section and middle section in the axial direction of the cylindrical section 15.

Furthermore, in this example, it is possible to make the contact pressure between the slinger fitting surface 20 and the circumferential surface of the cylindrical section 15 of the slinger uniform around the entire circumference. In other words, when the entire cylindrical section 15 of the slinger 13 is pressure fitted onto the slinger fitting surface 20, it becomes easy for a state to occur in which, due to the effect of the stress in the circumferential direction of the circular ring section 16, the portion of the edge of one end in the axial direction of the circumferential surface of the cylindrical section 15 comes in very strong contact with the slinger fitting surface 20. Incidentally, because the slinger 13 is composed of a metal plate formed by stamping, it becomes easy for the shape of the portion of the edge on one end in the axial direction of the inner circumferential surface of the cylindrical section 15 to become non-uniform in the circumferential direction. If this situation is going on, it becomes easy for the contact pressure between the slinger fitting surface 20 and the circumferential surface of the cylindrical section 15 to become non-uniform in the circumferential direction.

On the other hand, in this example, by press fitting only the other end section and middle section in the axial direction of the cylindrical section 15 of the slinger 13 onto the slinger fitting surface 20, the portion of the end on one end in the axial direction of the slinger fitting surface 20, that is, the joining section 27a between the slinger fitting surface 20 and the surface 25a that is adjacent to that one side in the axial direction has maximum contact with the middle section in the axial direction of the circumferential surface of the cylindrical section 15. This joining section 27a is formed by grinding with a formed grindstone, so the resulting shape is uniform in the circumferential direction. Moreover, the resulting shape of the middle section in the axial direction of the cylindrical section 15 is also comparatively uniform in the circumferential direction when compared with the portion of the edge of the one end in the axial direction of the circumferential surface of this cylindrical section 15. Therefore, the contact pressure between the slinger fitting surface 20 and the circumferential surface of the cylindrical section 15 is uniform around the circumference.

In this way, together with being able to increase the width of substantial contact in the axial direction between the slinger fitting surface 20 and the circumferential surface of the cylindrical section 15 of the slinger 13, it is possible to make the contact pressure between the slinger fitting surface 20 and the circumferential surface of the cylindrical section 15 nearly uniform around the entire circumference, so a good seal is possible in this fitting section. Moreover, with this construction, it is possible to improve the robustness of the product, and design for improving the seal between the slinger fitting surface 20 and the cylindrical section 15 becomes simpler.

The effect of the construction described above can be obtained by applying the construction of "fastening only the other end section and the middle section in the axial direction of the cylindrical section of the slinger to the slinger fitting surface with a tight fit by performing a press fitting from one side in the axial direction of the slinger fitting surface" even without applying the construction wherein "the continuous section of the surface of one ring, which comprises the portion corresponding to the slinger fitting surface, the portion corresponding to another surface that is adjacent to the one side in the axial direction of the slinger fitting surface, and the joining section between the portion corresponding to the slinger fitting surface and the other portion, are simultaneously ground with a formed grindstone after heat treatment of the one ring, so that the continuous section is made into a smooth, continuous flat surface with no non-differential corners in the cross-sectional shape". However, by applying the construction of the former together with the construction of the later, the effect can be sufficiently increased. Furthermore, by preventing the circular ring section 16 from tilting due to contact pressure gradient at this fitting section, it is possible to prevent a decrease in durability of the seal lips of the seal member that comes in sliding contact with the surface of this circular ring section 16.

The other construction and function are the same as in the case of the first example illustrated in FIG. 1 to FIG. 5 described above. However, as described above, in this example, the effect from the technology of not press fitting the inside end section in the axial direction of the cylindrical section 15 of the slinger onto the slinger fitting surface 20 of the inner ring 19a is also obtained when the joining section 27a takes the form of a sharp edge.

Fifth Example of Embodiment

Figure 9:
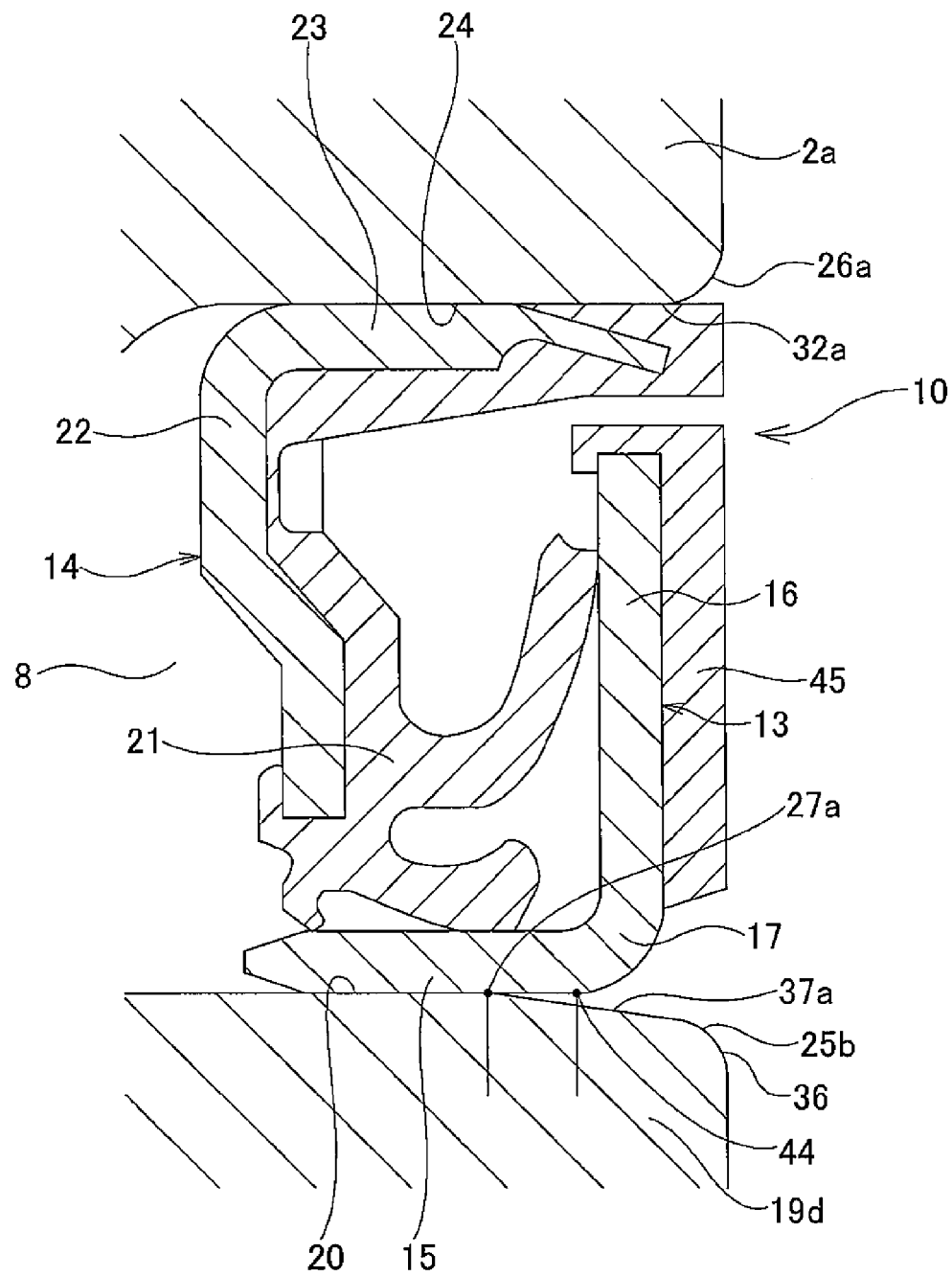
FIG. 9 illustrates a fifth example of an embodiment of the present invention, and is a cross-sectional view similar to FIG. 1.

FIG. 9 illustrates a fifth example of an embodiment of the present invention. In this example as well, as in the fourth example described above, only the outside end section and middle end section in the axial direction of the cylindrical section 15 of the slinger 13 is fitted onto the slinger fitting surface 20 of the inner ring 19d with a tight fit by performing press fitting from the inside in the axial direction. However, in this example, as in the second example illustrated in FIG. 6 and described above, a conical surface section 37a is formed on the portion next to the inside in the axial direction of the slinger fitting surface 20, and by increasing the dimension in the axial direction of this conical surface section 37a, the surface on the inside end in the axial direction of the inner ring 19d is made to be flush with the surface on the inside end in the axial direction of the outer ring 2a (positioned on the same plane). Moreover, a circular ring shaped encoder 45 for a rotation speed detector is mounted and fastened to the inside surface of the circular ring section 16 of the slinger 13, and the inside surface of this encoder 45 is flush with the surface on the inside end in the axial direction of the outer ring 2a and inner ring 19d. In this example, by making these surfaces flush with each other, it is possible to improve the workability during mass production. It is also possible to make the inside surface of the circular ring section 16 of the slinger 13 flush with the surface on the inside end in the axial direction of the outer ring 2a and inner ring 19d without mounting an encoder. In either case, by providing a conical surface section 37a, it is possible to improve workability during mass production by making the inside surface of the encoder 45 or the circular ring section 16 flush with the surface on the inside end in the axial direction of the outer ring 2a and inner ring 19d without press fitting the inside end section in the axial direction of the cylindrical section 15 of the slinger 13 onto the slinger fitting surface 20. The other construction and function are the same as in the case of the other examples described above.

Figure 10:
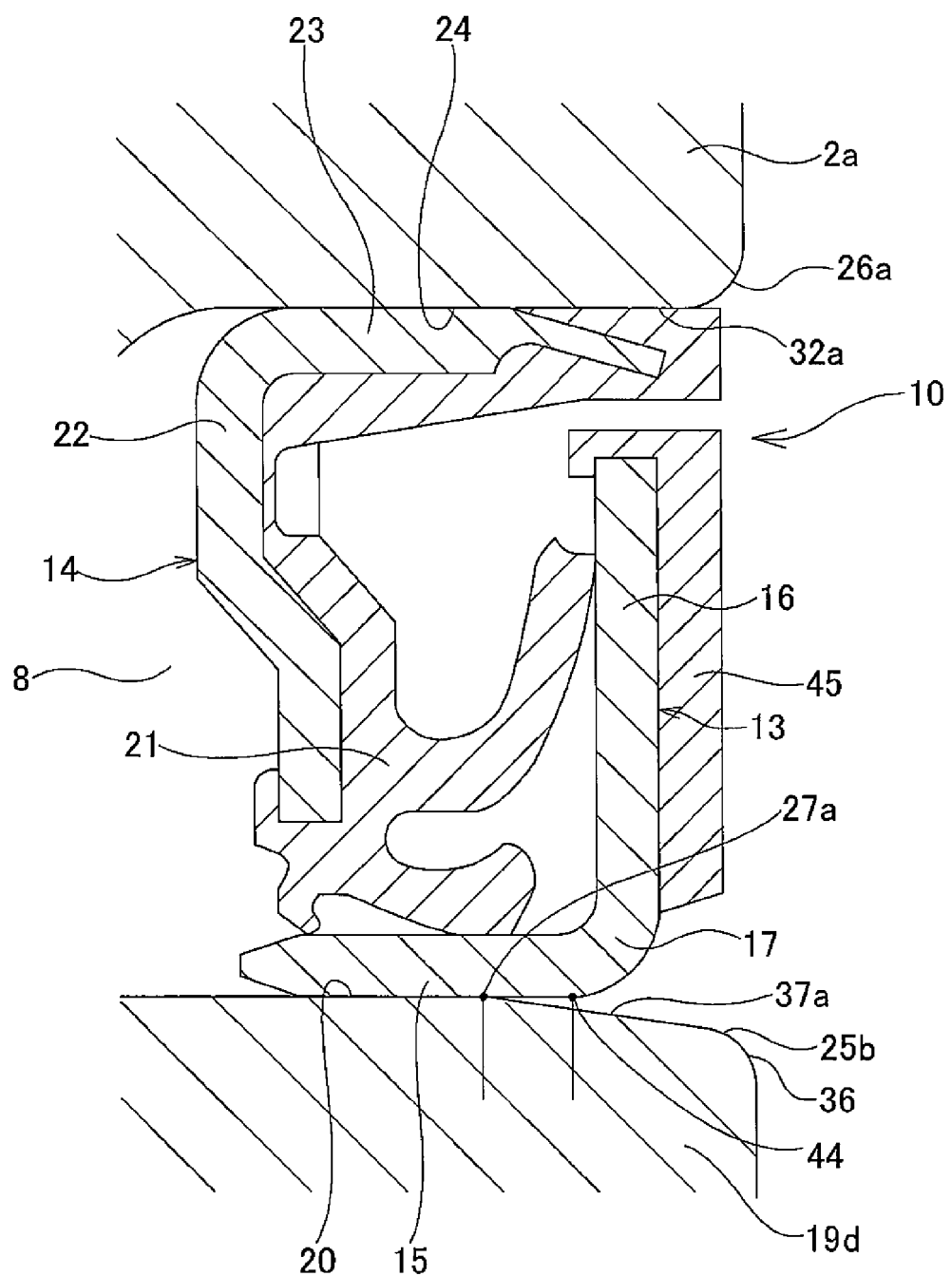
FIG. 10 illustrates a variation of the fifth example of an embodiment of the present invention, and is a cross-sectional view similar to FIG. 1.
Figure 11:
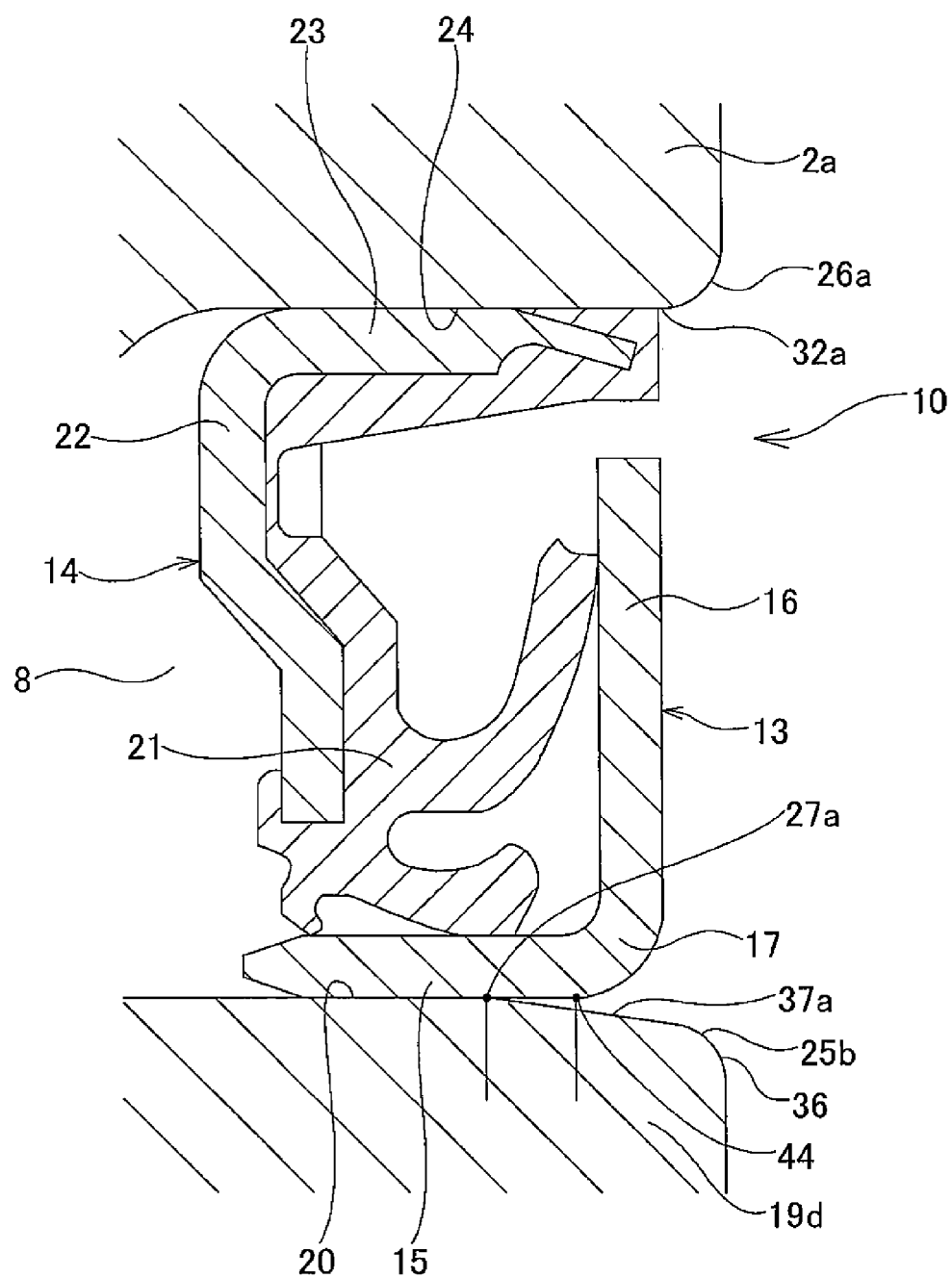
FIG. 11 illustrates another variation of the fifth example of an embodiment of the present invention, and is a cross-sectional view similar to FIG. 1.

FIG. 10 and FIG. 11 illustrate variations of the fifth example of an embodiment of the present invention. The difference between the two variations is having or not having an encoder 45 mounted. In these variations, as in the example illustrated in FIG. 9 and described above, the surface on the inside in the axial direction of the inner ring 19d is flush with the surface on the inside end in the axial direction of the outer ring 2a. However, the inside surface of the encoder 45 in the example in FIG. 10, and the inside surface of the circular ring section 16 of the slinger 13 in the example in FIG. 11 are both arranges so as to be further on the outside in the axial direction than the surface in the inside end in the axial direction of the outer ring 2a and the inner ring 19d. In these variations, by protecting the protruding outer ring 2a and inner ring 19d by the inside surface of the encoder 45 or circular ring section 16, it is possible to prevent input of careless force or surface damage to the encoder 45 during assembly work.

Sixth Example of Embodiment

Figure 12:
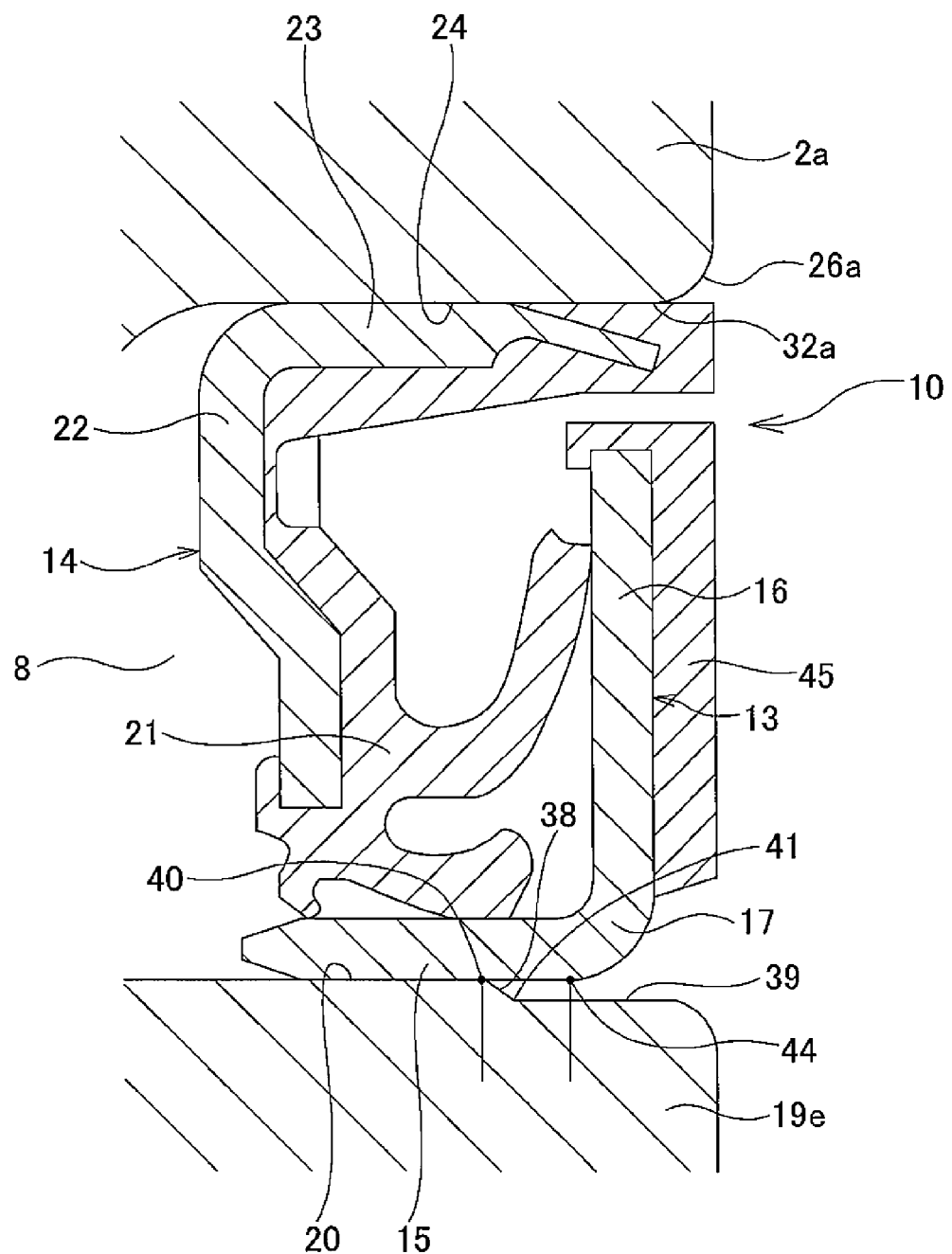
FIG. 12 illustrates a sixth example of an embodiment of the present invention, and is a cross-sectional view similar to FIG. 1.

FIG. 12 illustrates a sixth example of an embodiment of the present invention. In this example, of the outer circumferential surface of the inner ring 19e, the shape of the portion further on the inside in the axial direction than the slinger fitting surface 20 has the same shape (shape having a conical surface section 38 and small-diameter stepped section 39) as in the third example illustrated in FIG. 7 and described above. The other construction and function are the same as in the fifth example described above, where the surfaces on inside end in the axial direction of the inner ring 19e and the outer ring 2a are flush with the inside surface of the encoder 45.

Example 7

Figure 13:
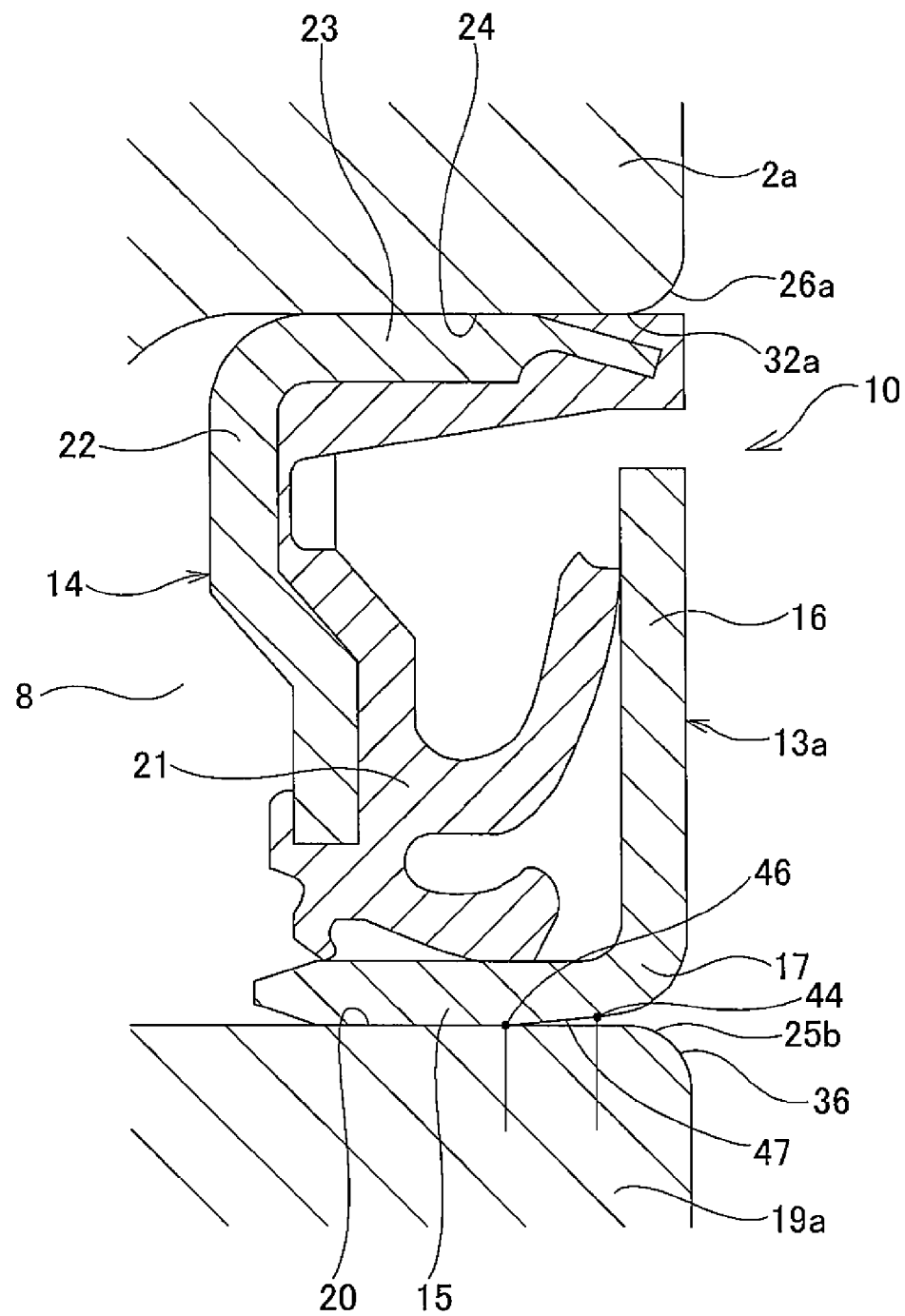
FIG. 13 illustrates a seventh example of an embodiment of the present invention, and is a cross-sectional view similar to FIG. 1.

FIG. 13 illustrates a seventh example of an embodiment of the present invention. In this example, as in the case of the first example described above, the cylindrical section 15 of the slinger 13a is fitted onto the slinger fitting surface 20 of the inner ring 19a by performing press fitting from the inside in the axial direction. However, of the cylindrical section 15 of the slinger 13a, a tapered section 47 whose outer shape dimensions become smaller going toward the outside in the axial direction is formed on outside in the axial direction from the slinger R end 44, and a joining section 46 between the tapered section 47 and the cylindrical section 15 is formed on the outside in the axial direction of this tapered section 47. By forming a tapered shape between the joining section 46 and the slinger R end section 44, the same effect as in the sixth example described above is obtained even when a conical surface section or small stepped section is not formed on the inner ring 19a. The slinger 13a is formed by pressing metal plate, and the tapered section 47 is also formed by pressing.

Eighth Example of Embodiment

Figure 14:
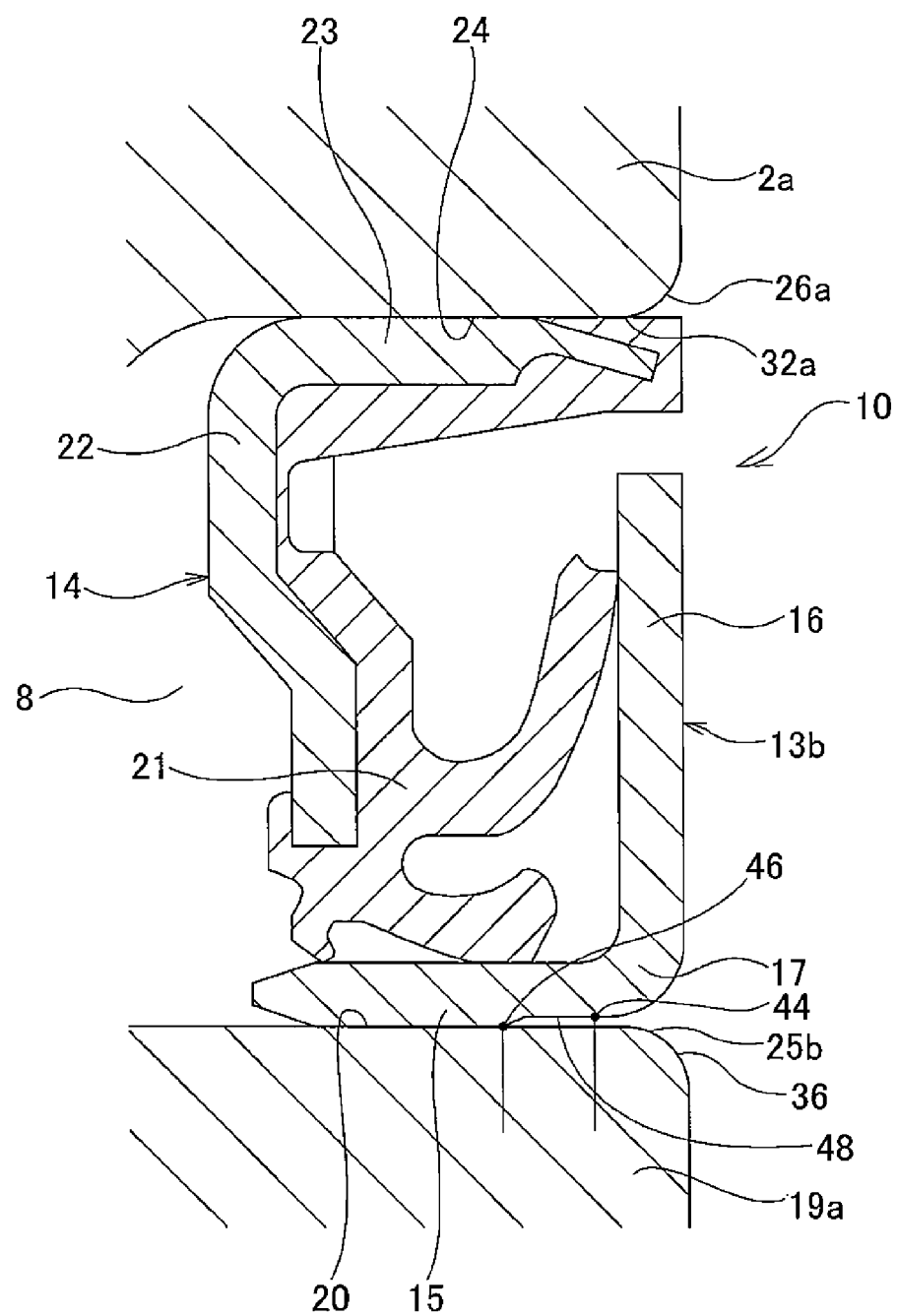
FIG. 14 illustrates a variation of the seventh example of an embodiment of the present invention, and is a cross-sectional view similar to FIG. 1.

FIG. 14 illustrates an eighth example of an embodiment of the present invention. In this example, of the cylindrical section 15 of the slinger 13b, the shape of the portion corresponding to the tapered section 47 in the seventh example described above is a cylindrical stepped section 48, and a joining section 46 with the cylindrical section 15 is formed on the outside in the axial direction of this stepped section 48. The other construction and function are the same as in the seventh example described above. The stepped section 48 can be formed by setting the chamfer of the punch in the burring process to be a little less than the proper value when performing bending, and by catching the border between the chamfer and the inner diameter section on the punch and pulling to make the thickness thin.

Figure 15:
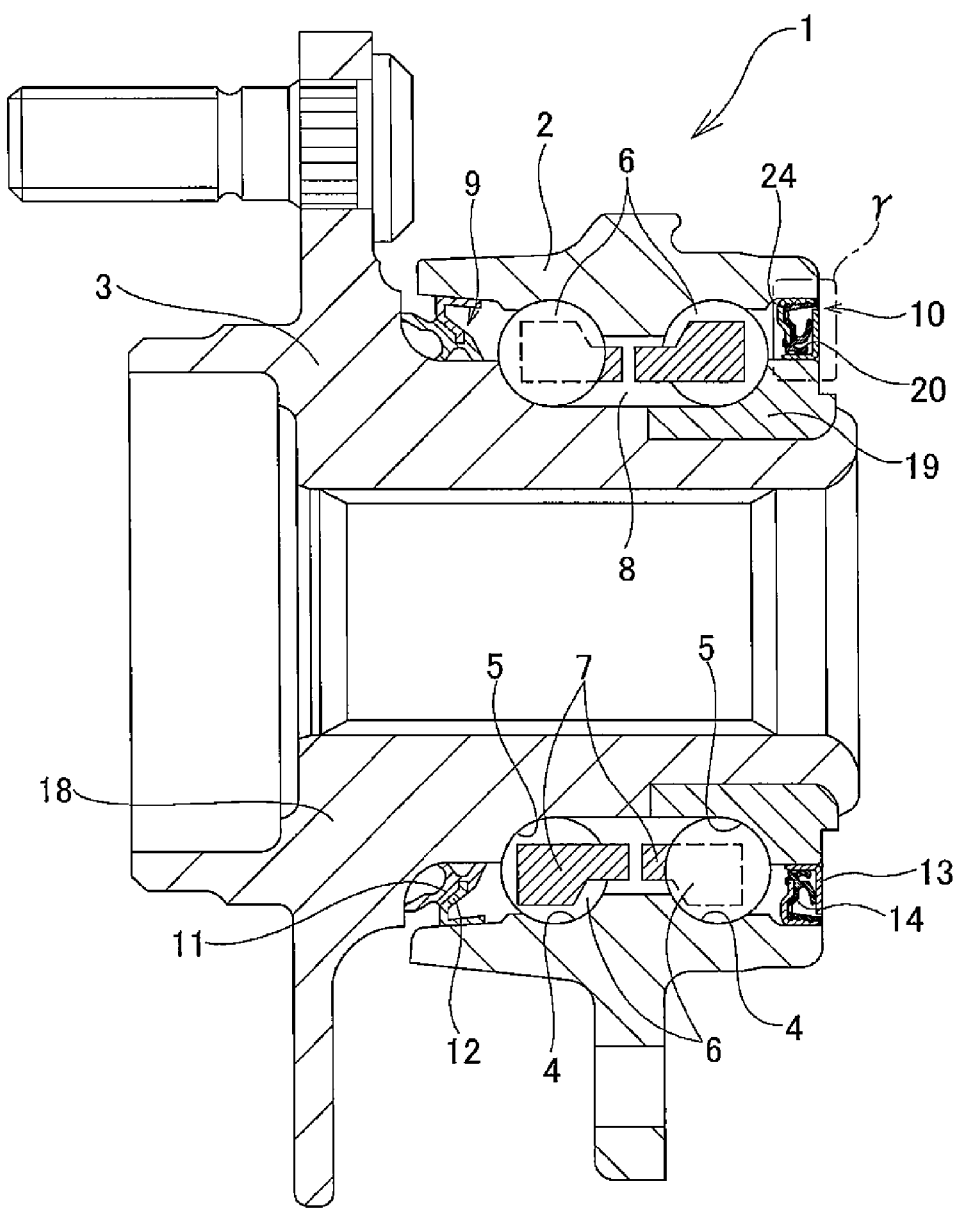
FIG. 15 is a cross-sectional view illustrating an example of conventional construction.
Figure 16:
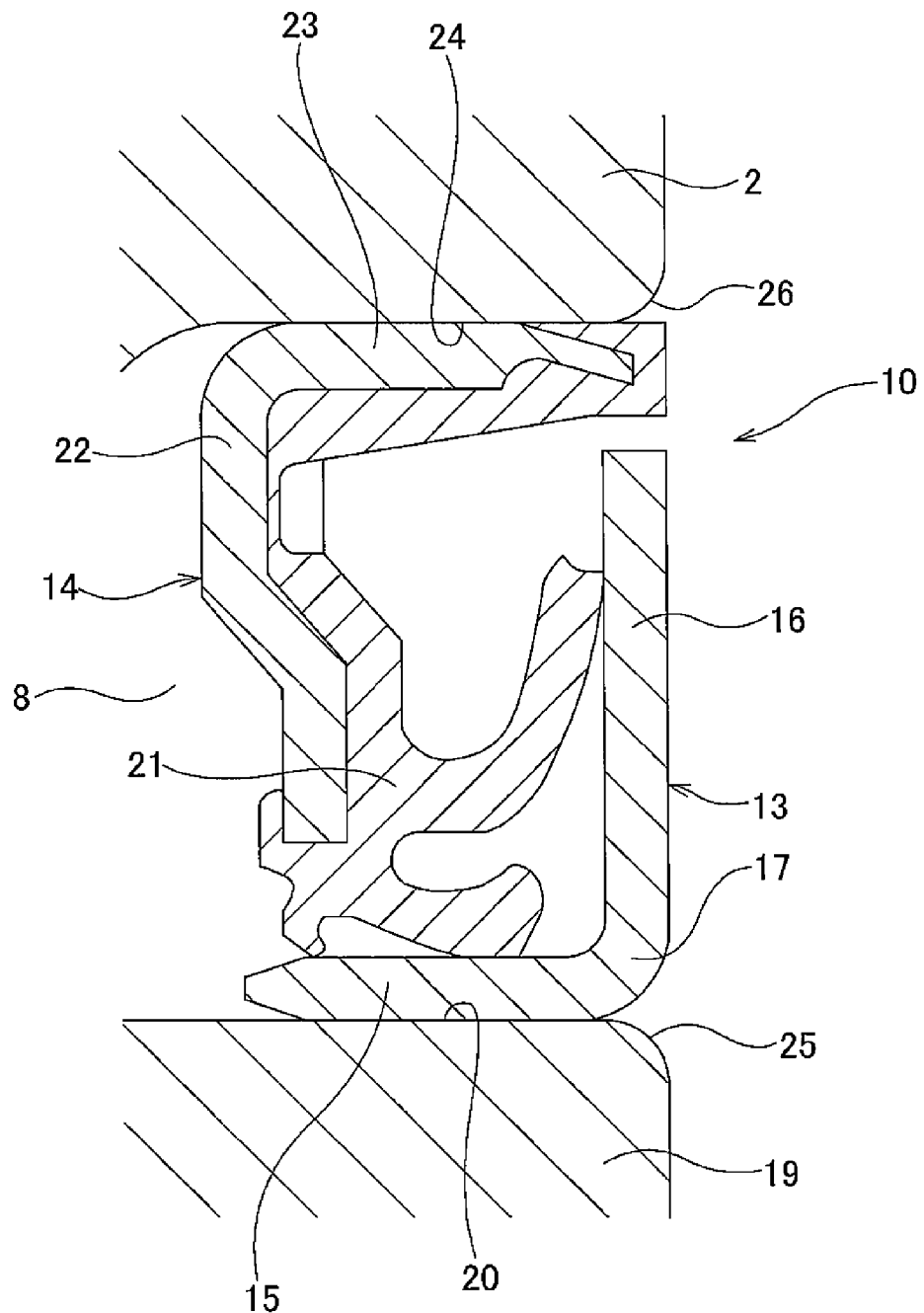
FIG. 16 is an enlarged cross-sectional view of part γ in FIG. 15.
Figure 17:
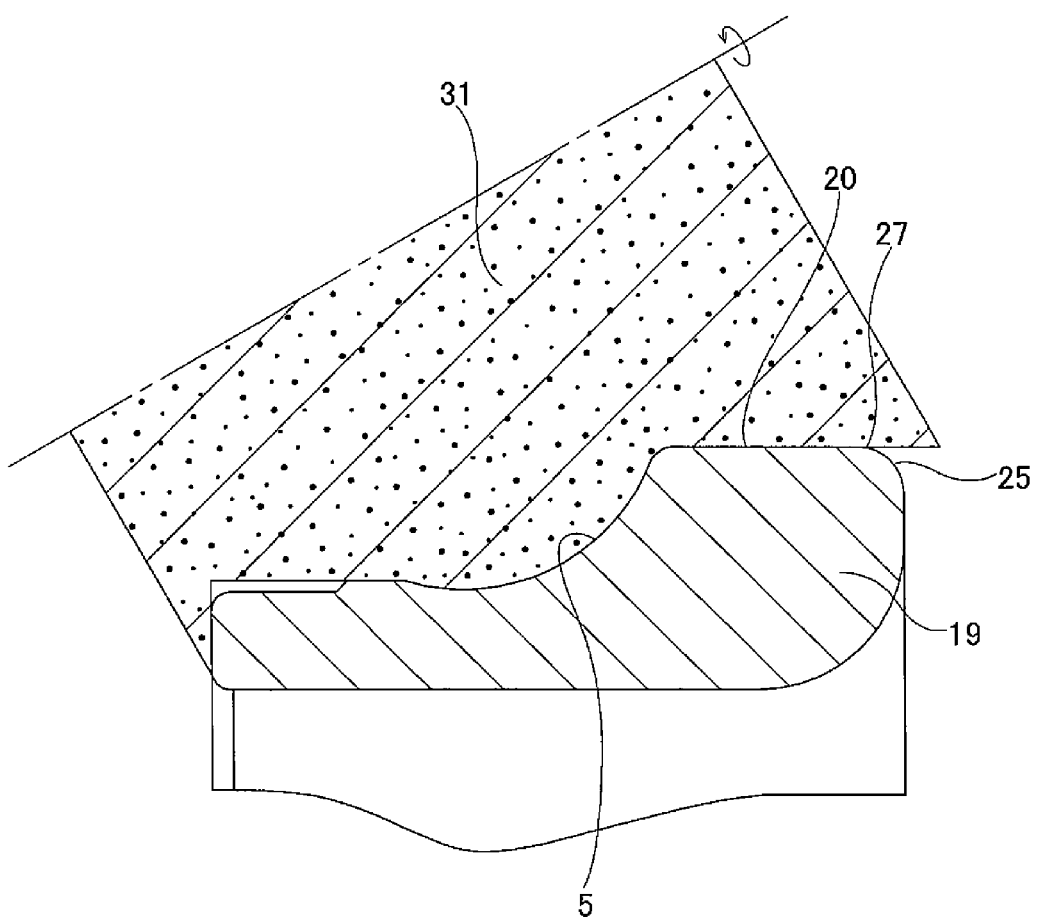
FIG. 17 is a partial cross-sectional view illustrating an example of a conventional grinding method for grinding the surface of the inner ring.
Figure 18:
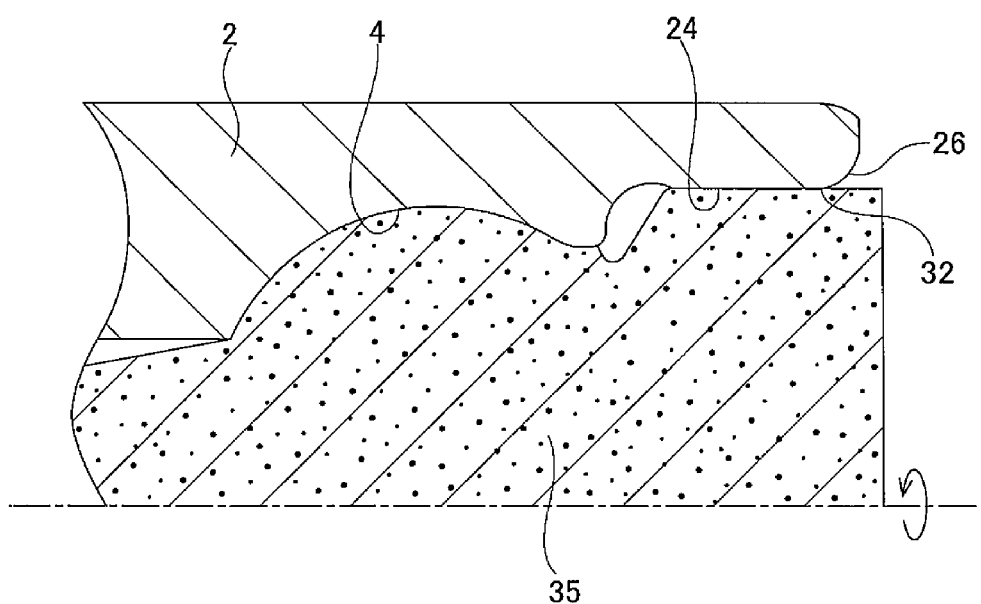
FIG. 18 is a partial cross-sectional view illustrating an example of a conventional grinding method for grinding the surface of the outer ring.

When embodying the present invention, the rolling bearing unit with a combined seal ring is not limited to a rotating inner ring type as illustrated in FIG. 15 and described above, and could also be a rotating outer ring type. Moreover, in the second example and later, only the relationship between the slinger and the slinger fitting surface was explained, however, similar construction can also be applied to the relationship between the seal ring and the seal ring fitting surface.

EXPLANATION OF REFERENCE NUMBERS

1 Rolling bearing unit
2, 2a Outer ring
3 Hub
4 Outer raceway
5 Inner raceway
6 Ball
7 Retainer
8 Annular space
9 Seal ring
10 Combined seal ring
11 Seal member
12 Metal insert
13 Slinger
14 Seal ring
15 Cylindrical section
16 Circular ring section
17 Curved section
18 Hub body
19, 19a to 19e Inner ring
20 Slinger fitting surface
21 Seal member
22 Metal insert
23 Cylindrical section
24 Seal ring fitting surface
25, 25a, 25b Chamfered section
26, 26a Chamfered section
27, 27a Joining section
28 Counter bore
29 Joining section
30 Joining section
31, 31a Grindstone
32, 32a Joining section
33 Counter bore
34 Joining section
35, 35a Grindstone
36 Convex surface section
37, 37a Conical surface section
38 Conical surface section
39 Small-diameter stepped section
40 Joining section
41 Joining section
42 Press fitting tool
43 Surface on the outside end in the axial direction
44 Slinger R end section
45 Encoder
46 Joining section
47 Tapered section
48 Stepped section

What is claimed is:

1. A rolling bearing unit with a combined seal ring, the rolling bearing unit comprising:

a rotational-side ring and a stationary-side ring that are arranged concentric with each other; and a plurality of rolling elements that are located between a rotational-side raceway and a stationary-side raceway that are formed on opposing circumferential surfaces of the rotational-side ring and the stationary-side ring so as to be able to roll freely;

a cylindrical shaped slinger fitting surface, which is formed on a portion in the axial direction of the circumferential surface of a selected one of the rotational-side ring and the stationary-side ring that faces the circumferential surface of the other ring; and the combined seal ring comprising a slinger and a seal ring that seal the openings of an annular space that exists between the opposing circumferential surfaces of the rotational-side ring and the stationary-side ring;

the slinger made of a metal plate that is entirely formed into a circular ring shape that includes a cylindrical section in part of the radial direction that extends in the axial direction; a circular ring section that is bent in the radial direction toward the other ring from one of both end edges in the axial direction of the cylindrical section, which corresponds to the end edge in the axial direction of the cylindrical section on the opposite side from the direction of press fitting the cylindrical section onto the slinger fitting surface; and a curved section having an arc shaped cross section that is located in the connecting section between the circular ring section and the cylindrical section; and a slinger R end section, which is a joining section between an inner circumferential surface of the cylindrical section and an inner circumferential surface of the curved section; and the seal ring comprising a circular ring shaped metal insert and a circular ring shaped seal member made of an elastic material and reinforced by the metal insert, the metal insert fitting on a portion in the axial direction of the circumferential surface of the other ring that faces the slinger, and the tip end sections of a plurality of seal lips of the seal member coming into sliding contact all the way around the surface of the slinger; wherein a conical surface is formed that is adjacent to one side in the axial direction of the slinger fitting surface on the surface of the selected ring, and by simultaneously grinding with a formed grindstone a continuous section on the surface of the one ring that comprises a portion corresponding to the slinger fitting surface, a portion corresponding the conical surface, and a joining section between the portion corresponding to the slinger fitting surface and the portion corresponding to the conical surface after performing heat treatment of the selected ring, the continuous section is entirely formed into a smooth, continuous flat surface with no non-differential corners in its cross-sectional shape, and an inclination angle of the portion corresponding to the conical surface is 5 to 15 degrees toward the one side in the axial direction, and when the selected ring is an inner ring, a diameter of an end edge on the one side in the axial direction of the portion corresponding to the conical surface is less than an inner diameter dimension of the cylindrical section of the slinger before press fitting, or when the selected ring is an outer ring, the diameter of the end edge on the one side in the axial direction of the portion corresponding to the conical surface is greater than an outer diameter dimension of the cylindrical section of the slinger before press fitting, and only an end section on another side and a middle section in the axial direction of the cylindrical section of the slinger is fitted onto the slinger fitting surface by a tight fit by performing press fitting from one side in the axial direction of the slinger fitting surface, and the slinger R end section is located further on the one side in the axial direction than the joining section between the portion corresponding to the slinger fitting surface and the portion corresponding to the conical surface.

2. The rolling bearing unit with the combined seal ring according to claim 1, wherein, when the selected ring is the inner ring, a cylindrical shaped small-diameter stepped section is formed adjacent to the one side in the axial direction of the portion corresponding to the conical surface, or when the selected ring is the outer ring, a cylindrical shaped large-diameter stepped section is formed adjacent to the one side in the axial direction of the portion corresponding to the conical surface.

* * * * *